(12) United States Patent
Seregin et al.

(10) Patent No.: US 9,344,716 B2
(45) Date of Patent: May 17, 2016

(54) ADAPTIVE FILTERING METHOD AND APPARATUS

(75) Inventors: Vadim Seregin, Suwon-si (KR); Jianle Chen, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 392 days.

(21) Appl. No.: 13/876,703

(22) PCT Filed: Sep. 28, 2011

(86) PCT No.: PCT/KR2011/007163
§ 371 (c)(1),
(2), (4) Date: Mar. 28, 2013

(87) PCT Pub. No.: WO2012/044074
PCT Pub. Date: Apr. 5, 2012

(65) Prior Publication Data
US 2013/0182762 A1 Jul. 18, 2013

Related U.S. Application Data

(60) Provisional application No. 61/387,135, filed on Sep. 28, 2010.

(51) Int. Cl.
*H04N 7/12* (2006.01)
*H04N 19/117* (2014.01)
*H04N 19/176* (2014.01)
*H04N 19/172* (2014.01)
*H04N 19/14* (2014.01)
*H04N 19/86* (2014.01)

(52) U.S. Cl.
CPC ....... *H04N 19/00066* (2013.01); *H04N 19/117* (2014.11); *H04N 19/14* (2014.11); *H04N 19/172* (2014.11); *H04N 19/176* (2014.11); *H04N 19/86* (2014.11)

(58) Field of Classification Search
USPC ..................................................... 375/240.03
See application file for complete search history.

(56) References Cited

U.S. PATENT DOCUMENTS

| 7,782,963 B2 | 8/2010 | Foo et al. |
| 8,045,615 B2 | 10/2011 | Liang et al. |
| 8,471,049 B2 | 6/2013 | Lei et al. |

(Continued)

FOREIGN PATENT DOCUMENTS

| CN | 101248673 A | 8/2008 |
| CN | 101389016 A | 3/2009 |

(Continued)

OTHER PUBLICATIONS

Communication, dated Mar. 11, 2014, issued by the Australian Patent Office in counterpart Australian Patent Application No. 2011308202.

(Continued)

*Primary Examiner* — Tracy Li
(74) *Attorney, Agent, or Firm* — Sughrue Mion, PLLC

(57) ABSTRACT

A filtering method and apparatus for adaptively performing deblocking filtering are provided. The method includes: obtaining a parameter indicating how close pixel values of pixels adjacent to a block boundary are with respect to a predetermined line; determining a filtering strength at the block boundary based on the parameter; and performing filtering based on the filtering strength.

17 Claims, 18 Drawing Sheets

(56) References Cited

U.S. PATENT DOCUMENTS

| | | | |
|---|---|---|---|
| 9,118,899 B2 | 8/2015 | Xue et al. | |
| 2005/0244063 A1* | 11/2005 | Kwon et al. | 382/233 |
| 2006/0110062 A1 | 5/2006 | Chiang et al. | |
| 2006/0268985 A1* | 11/2006 | Liang et al. | 375/240.16 |
| 2008/0144722 A1 | 6/2008 | Park et al. | |
| 2008/0243981 A1 | 10/2008 | Wilson et al. | |
| 2009/0116546 A1 | 5/2009 | Park et al. | |
| 2009/0257678 A1* | 10/2009 | Chen | 382/274 |
| 2009/0279808 A1* | 11/2009 | Shiraishi | 382/275 |
| 2010/0027685 A1 | 2/2010 | Kim et al. | |
| 2010/0142844 A1 | 6/2010 | Pereira et al. | |
| 2011/0110603 A1 | 5/2011 | Ikai | |
| 2011/0200103 A1 | 8/2011 | Kim et al. | |

FOREIGN PATENT DOCUMENTS

| | | |
|---|---|---|
| CN | 101790089 A | 7/2010 |
| EP | 2157799 A1 | 2/2010 |
| JP | 2004-180248 A | 6/2004 |
| JP | 2006287972 A | 10/2006 |
| KR | 10-2009-0045035 A | 5/2009 |
| KR | 10-2009-0097833 A | 9/2009 |
| KR | 10-2010-0013277 A | 2/2010 |
| KR | 10-2010-0067059 A | 6/2010 |
| KR | 10-2010-0067069 A | 6/2010 |
| WO | 2010001911 A1 | 1/2010 |
| WO | 2010047499 A2 | 4/2010 |
| WO | 2011/096869 A1 | 8/2011 |

OTHER PUBLICATIONS

Communication, dated Jan. 28, 2014, issued by the Japanese Patent Office in counterpart Japanese Patent Application No. 2013-531490.

Norkin, Andrey, et al., "Development of HEVC deblocking filter," JCT-VC of ITU-T SG16 WP3 and ISO/IEC JTC1/SC29/WG11, 4th Meeting, Jan. 20-28, 2011, pp. 1-5, http://phenix.int-evry.fr/jct/doc_end_user/documents/4_Daegu/wg11/JCTVC-D377-v3.zip.

Norkin, Andrey, et al., "CE12: Ericsson's and MediaTek's deblocking filter," JCT-VC of ITU-T SG16 WP3 and ISO/IEC JTC1/SC29/WG11, 6th Meeting, Jul. 14-22, 2011, pp. 1-6, http://phenix.it-sudparis.eu/jct/doc_end_user/documents/6_Torino/wg11/JCTVC-F118-v6.zip.

Norkin, Andrey, et al., "CE12: Ericsson's and MediaTek's deblocking filter," JCT-VC of ITU-T SG16 WP3 and ISO/IEC JTC1/SC29/WG11, 6th Meeting, Aug. 15, 2011, 14 pages total, http://phenix.it-sudparis.eu/jct/doc_end_user/documents/6_Torino/wg11/JCTVC-F118-v6.zip.

Norkin, Andrey, et al., "CE12.1: Ericsson deblocking filter," JCT-VC of ITU-T SG16 WP3 and ISO/IEC JTC1/SC29/WG11, 5th Meeting, Mar. 16-23, 2011, pp. 1-17, http://phenix.int-evry.fr/jct/doc_end_user/documents/5_Geneva/wg11/JCTVC-E276-v2.zip.

International Search Report dated Apr. 26, 2012 issued in International Application No. PCT/KR2011/007163 (PCT/ISA/210).

Written Opinion dated Apr. 26, 2012 issued in International Application No. PCT/KR2011/007163 (PCT/ISA/237).

Communication dated Jan. 27, 2015 issued by the Canadian Intellectual Property Office in counterpart Canadian Patent Application No. 2,813,059.

Communication dated Mar. 27, 2015 issued by the Australian Government IP Australia in counterpart Australian Patent Application No. 2011308202.

Communication dated Jun. 3, 2015, issued by the State Intellectual Property Office of P.R. China in counterpart Chinese Application No. 201180047035.5.

Communication from the Japanese Patent Office dated Oct. 20, 2015 in a counterpart Japanese application No. 2015-011751.

Norkin A, et al., "Development of HEVC deblocking filter", 4. JCT-VC Meeting; 95. MPEG Meeting; Jan. 20, 2011-Jan. 28, 2011; Daegu;(Joint Collaborative Team on Video Coding of I SO/1 EC JTC1/SC29/WG11AND ITU-T SG.16 ); http://wftp3.itu.int/AV-ARCH/JCTVC-SITE/, No. JCTVC-D377, Jan. 16, 2011, XP030008416, total 4 pages.

List P et al: "Adaptive Deblocking Filter", IEEE Transactions on Circuits and Systems for Video Technology, IEEE Service Center, Piscataway, NJ, US, vol. 13, No. 7, Jul. 1, 2003, pp. 614-619, XP011221094.

Communication from the Canadian Patent Office issued Nov. 13, 2015 in a counterpart Canadian Application No. 2,813,059.

Communication from the European Patent Office issued Oct. 20, 2015 in a counterpart European Application No. 11829580.7.

Communication dated Jan. 22, 2016, issued by The State Intellectual Property Office of P.R. China in counterpart Chinese Application No. 201180047035.5.

* cited by examiner

FIG. 7
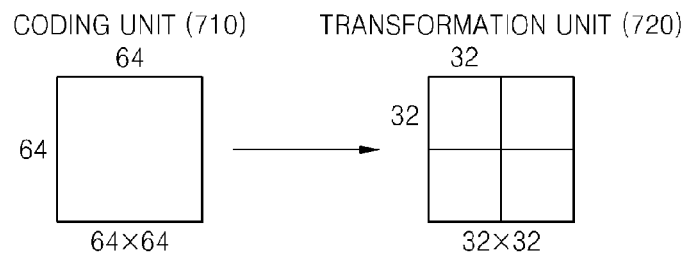
FIG. 8
PARTITION TYPE (800)
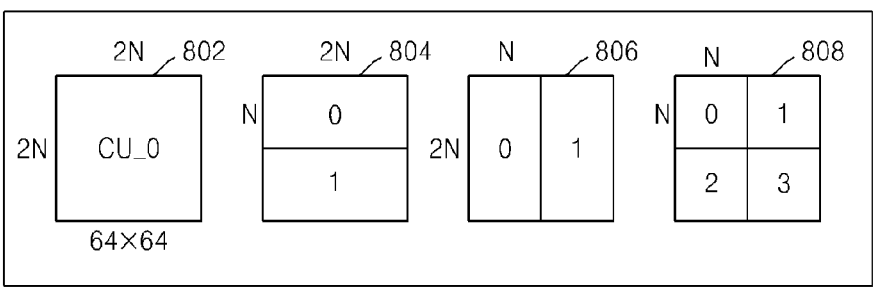
PREDICTION MODE (810)
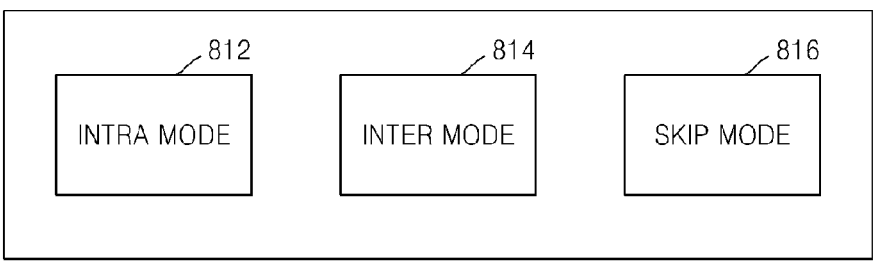
SIZE OF TRANSFORMATION UNIT (820)
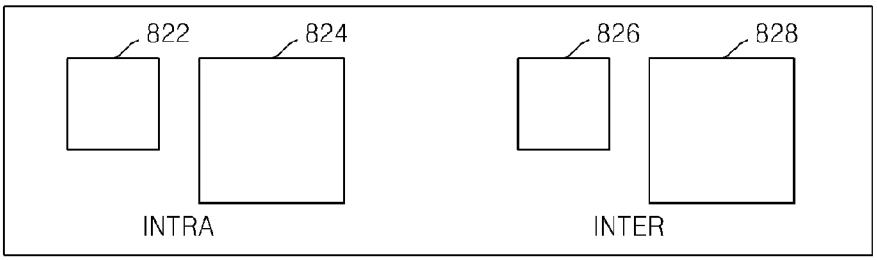

CODING UNITS (1010)

— FILTERING BOUNDARY

ADAPTIVE FILTERING METHOD AND APPARATUS

CROSS-REFERENCE TO RELATED APPLICATIONS

This application is a National Stage application under 35 U.S.C. §371 of International Application No. PCT/KR2011/007163, filed on Sep. 28, 2011, and claims the benefit of U.S. Provisional Application No. 61/387,135, filed on Sep. 28, 2010 in the United States Patent and Trademark Office, the disclosures of which are incorporated herein by reference in their entireties.

BACKGROUND

1. Field

Apparatuses and methods consistent with exemplary embodiments relate to encoding and decoding a video, and more particularly, to a method and apparatus for adaptive filtering performed to efficiently remove a blocking artifact generated when a video is encoded and decoded.

2. Description of the Related Art

As hardware for reproducing and storing high resolution or high quality video content is being developed and supplied, a demand for a video codec for effectively encoding or decoding the high resolution or high quality video content is increasing. In a related art video codec, a video is encoded according to a limited encoding method based on a macroblock having a predetermined size.

A prediction encoding method based on a macroblock may cause a blocking effect due to discontinuity of pixel values in a boundary between blocks. Thus, in order to increase a video compression rate and to improve quality of a restored image, a video codec performs deblocking filtering.

SUMMARY

One or more exemplary embodiments provide a method and apparatus for performing deblocking filtering that decreases the occurrence of a blocking artifact generated in a boundary region between blocks.

According to an aspect of an exemplary embodiment, there is provided an adaptive filtering method that performs filtering by deciding a filtering strength according to a parameter obtained based on pixel values of pixels adjacent to a block boundary.

According to an aspect of an exemplary embodiment, there is provided an adaptive filtering method including operations of: obtaining a parameter indicating how close pixel values of pixels adjacent to a block boundary are with respect to a predetermined line; determining a filtering strength at the block boundary based on the parameter; and performing filtering based on the filtering strength.

According to an aspect of another exemplary embodiment, there is provided an adaptive filtering apparatus including: a parameter obtainer which obtains a parameter indicating how close pixel values of pixels adjacent to a block boundary are with respect to a predetermined line; a filtering strength determiner which determines a filtering strength at the block boundary based on the parameter; and a filtering performer which performs filtering based on the filtering strength.

According to an aspect of another exemplary embodiment, there is provided an adaptive filtering method including operations of: parsing a received bitstream and then extracting image data encoded for each of coding units according to the coding units having a tree structure included in each of maximum coding units obtained by splitting a current picture, encoding mode information regarding the coding units having the tree structure, and information regarding deblocking filtering on each of the maximum coding units; determining prediction units and transformation units for prediction and transformation according to each of the coding units, based on the encoding mode information regarding the coding units having the tree structure, and then decoding the encoded image data; determining filtering boundaries to be deblocking-filtered based on boundaries of at least one of data units including the coding units having the tree structure, the prediction units, and the transformation units, by using the information regarding deblocking filtering; obtaining a parameter indicating how close pixel values of pixels adjacent to the determined filtering boundary are with respect to a predetermined line; determining a filtering strength at the block boundary based on the parameter; and performing filtering based on the filtering strength.

According to an aspect of another exemplary embodiment, there is provided an adaptive filtering method including: determining a filtering strength at a block boundary based on a closeness of pixel values of pixels adjacent to the block boundary with respect to a predetermined line; and performing filtering based on the determined filtering strength.

According to one or more exemplary embodiments, quality of a video may be significantly improved by removing a blocking artifact from the video that is compressed and then restored.

DESCRIPTION OF THE DRAWINGS

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

DETAILED DESCRIPTION OF EXEMPLARY EMBODIMENTS

Figure 1:
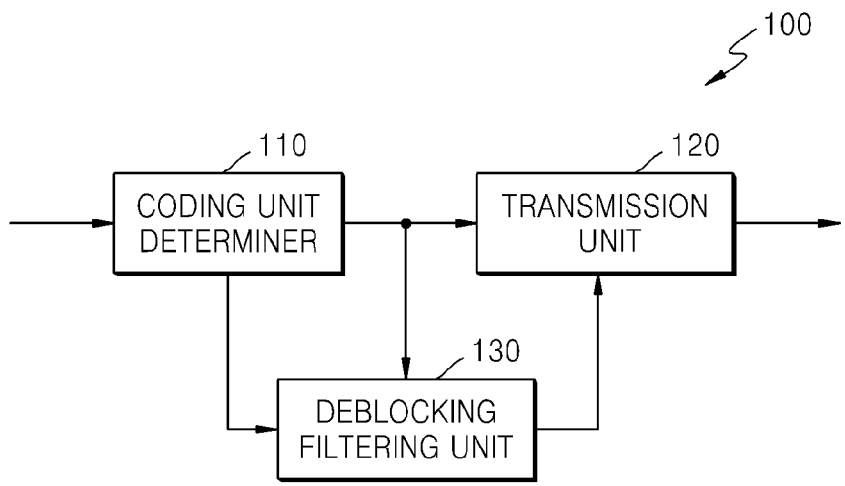
FIG. 1 is a block diagram of a video encoding apparatus for performing deblocking filtering according to an exemplary embodiment.

Hereinafter, exemplary embodiments will be described with reference to the attached drawings. FIG. 1 is a block diagram of a video encoding apparatus for performing deblocking filtering 100 according to an exemplary embodiment.

The video encoding apparatus for performing deblocking filtering 100 (hereinafter, referred to as 'video encoding apparatus 100') according to the present exemplary embodiment includes a coding unit determiner 110, a deblocking filtering unit 130 (e.g., deblocking filterer), and a transmission unit 120 (e.g., transmitter).

The coding unit determiner 110 receives image data of a picture of a video, and divides the image data into a maximum coding unit that is a data unit having a maximum size. The maximum coding unit according to an exemplary embodiment may be a data unit having a size of 32×32, 64×64, 128×128, 256×256, etc., wherein a shape of the data unit is a square having a width and length in squares of 2 which is greater than 8.

For each maximum coding unit, the coding unit determiner 110 determines coding units that are hierarchically classified according to each of regions that are spatially divided. The hierarchically-classified coding units of the maximum coding unit are expressed based on a depth indicating a number of times the maximum coding unit is spatially divided. Coding units having a tree structure may include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions.

The coding unit determiner 110 may encode each of deeper coding units included in a current maximum coding unit, may compare encoding results of coding units of an upper depth and coding units of a lower depth in each region, and then may determine coding units and a coded depth there whose are to output an optimal encoding result. Also, a coded depth in a current region may be independently determined from a coded depth in another region.

Thus, the coding unit determiner 110 may determine coding units having a tree structure which are coding units of a coded depth independently determined in each region. Also, the coding unit determiner 110 performs prediction encoding so as to determine the coding units of the coded depth. The coding unit determiner 110 may determine a prediction unit or a partition, which is a data unit by which the prediction encoding is performed to allow the coding units of the coded depth to output an optimal encoding result. For example, a partition type with respect to a coding unit of 2N×2N may include partitions having sizes of 2N×2N, 2N×N, N×2N, and N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes. Also, a prediction mode of a partition type may be an intra mode, a inter mode, or a skip mode.

The coding unit according to an exemplary embodiment may be characterized by a maximum size and a depth. The depth is an index according to a number of times the coding unit is hierarchically split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Coding units according to a tree structure in a maximum coding unit and a method of determining a partition, according to exemplary embodiments, will be described in detail later with reference to FIGS. 3 through 13.

The deblocking filtering unit 130 determines filtering boundaries to be deblocking-filtered based on at least one of coding units, prediction units, and transformation units, determines a filtering strength at the filtering boundaries based on pixel values of pixels adjacent to the filtering boundaries, and performs deblocking filtering based on the filtering strength. For example, when the coding units, the prediction units, and the transformation units are determined as will be described later, the deblocking filtering unit 130 may determine boundaries of data units as the filtering boundaries to be deblocking-filtered, wherein each of the data units has a size equal to or greater than a predetermined size, and may perform the deblocking filtering on the pixel values adjacent to the filtering boundaries.

The transmission unit 120 encodes information regarding the deblocking filtering determined by the deblocking filtering unit 130, and may transmit the information together with encoded data of a picture and encoding mode information regarding coding units having a tree structure of a maximum coding unit. The information regarding the deblocking filtering may include filtering boundary determination information such as a data unit size to determine the data unit by which the deblocking filtering is performed from among boundaries of data units including the coding units, the prediction units, and the transformation units according to the tree structure.

The transmission unit 120 may insert the information regarding the deblocking filtering into a sequence parameter set (SPS) or a picture parameter set (PPS) of the picture and then may transmit it.

Determination of filtering boundaries for deblocking filtering, and a deblocking filtering process, according to exemplary embodiments, will be described in detail later with reference to FIGS. 14 through 33.

The coding unit determiner 110 may determine coding units having an optimum shape and an optimum size for each maximum coding unit, based on the size of the maximum coding unit and the maximum depth determined by considering characteristics of a current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a related art macroblock whose size is fixed to 16×16 or 8×8, a number of macroblocks per picture excessively increases. Accordingly, a number of pieces of compressed information generated for each macroblock increases, and thus it is difficult to transmit the compressed information and data compression efficiency decreases. However, by using the coding unit determiner 110, image compression efficiency may be increased since a coding unit is adjusted while considering characteristics of an image while increasing a maximum size of a coding unit while considering a size of the image.

Also, by using a reference picture that is deblocking-filtered based on the coding units having a tree structure, prediction encoding may be performed while decreasing a difference with an original picture.

Figure 2:
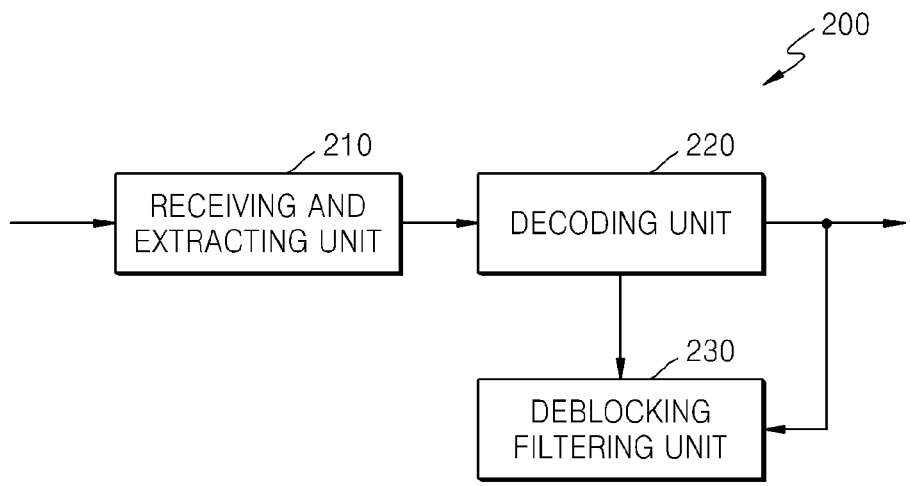
FIG. 2 is a block diagram of a video decoding apparatus for performing deblocking filtering based on coding units having a tree structure, according to an exemplary embodiment.

FIG. 2 is a block diagram of a video decoding apparatus for performing deblocking filtering based on coding units having a tree structure 200, according to an exemplary embodiment.

The video decoding apparatus for performing deblocking filtering based on coding units having a tree structure 200 (hereinafter, referred to as 'video decoding apparatus 200') according to the present exemplary embodiment includes a receiving and extracting unit 210 (e.g., receiver and extractor), a decoding unit 220 (e.g., decoder), and a deblocking filtering unit 230 (e.g., deblocking filterer).

The receiving and extracting unit 210 receives and parses a bitstream of a video, and then extracts encoded image data for each coding unit, wherein the coding units have a tree structure according to each maximum coding unit, and extracts coding mode information and deblocking filtering information regarding the coding units having the tree structure. The receiving and extracting unit 210 may extract the deblocking filtering information from an SPS or a PPS of a picture.

The decoding unit 220 decodes the encoded image data for each coding unit, based on the coding mode information regarding the coding units having the tree structure, which is extracted by the receiving and extracting unit 210.

The decoding unit 220 may determine coding units of a coded depth, and a partition type, a prediction mode, a transformation unit, or the like of each of the coding units included in the maximum coding unit, based on the coding mode information regarding the coding units having the tree structure according to each maximum coding unit.

The decoding unit 220 may decode the encoded image data of the maximum coding unit by decoding the encoded image data based on the partition type, the prediction mode, and the transformation unit determined for each of the coding units having the tree structure which are included in the maximum coding unit.

The image data decoded by the decoding unit 220, and the deblocking filtering information filtered by the receiving and extracting unit 210 are input to the deblocking filtering unit 230.

The deblocking filtering unit 230 determines filtering boundaries to be deblocking-filtered which are from among boundaries of at least one of data units including the coding units having the tree structure, prediction units, and transformation units, determines a filtering strength at the filtering boundary based on pixel values of pixels adjacent to the filtering boundaries, and performs deblocking filtering on the decoded image data based on the filtering strength.

Since prediction decoding is performed on a next picture by referring to a reference picture that is deblocking-filtered by the deblocking filtering unit 230, a difference between a restored image and an original picture may be decreased.

Figure 3:
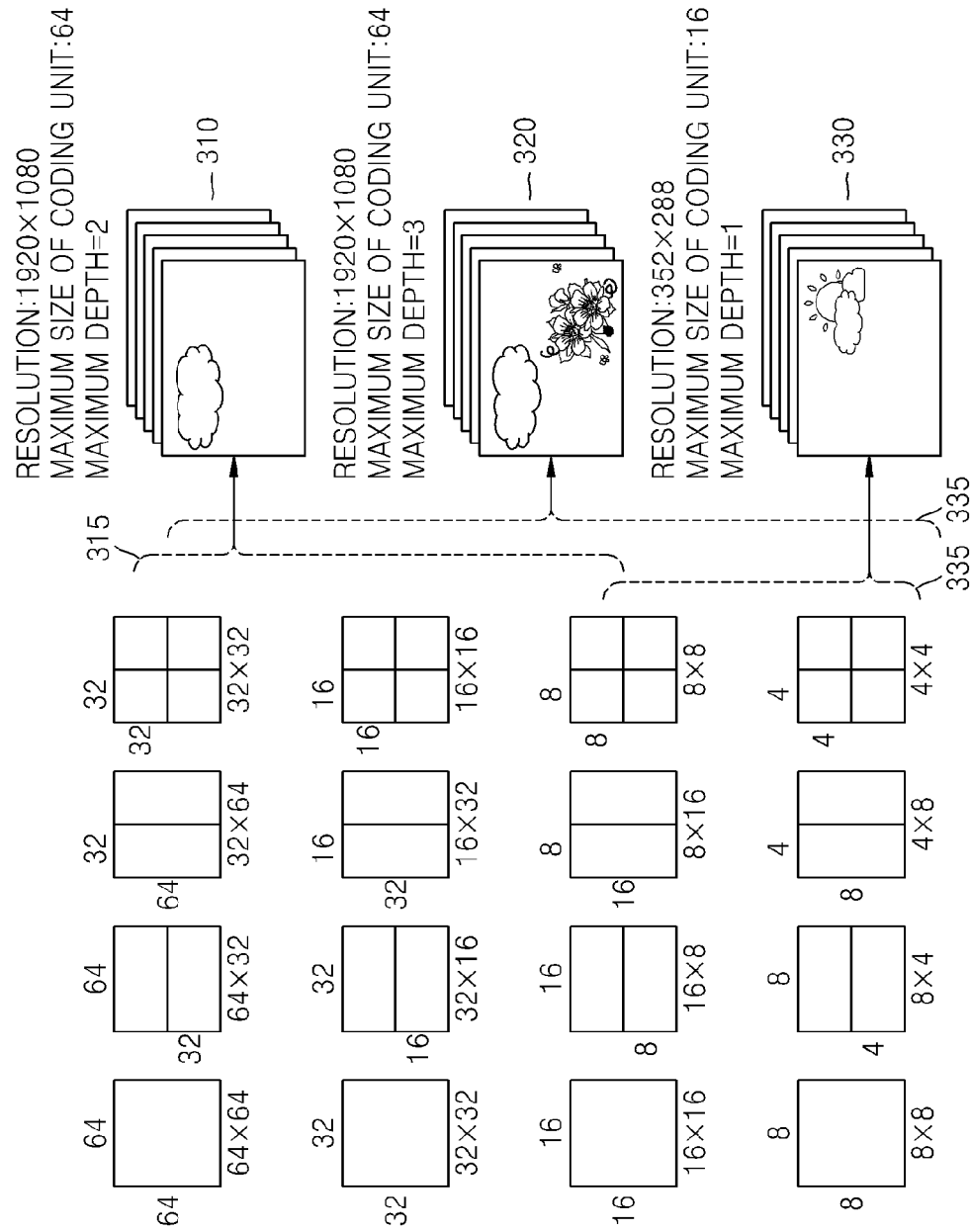
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into prediction units of 32×32, 32×16, 16×32, or 16×16, a coding unit of 16×16 may be split into prediction units of 16×16, 16×8, 8×16, or 8×8, and a coding unit of 8×8 may be split into prediction units of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
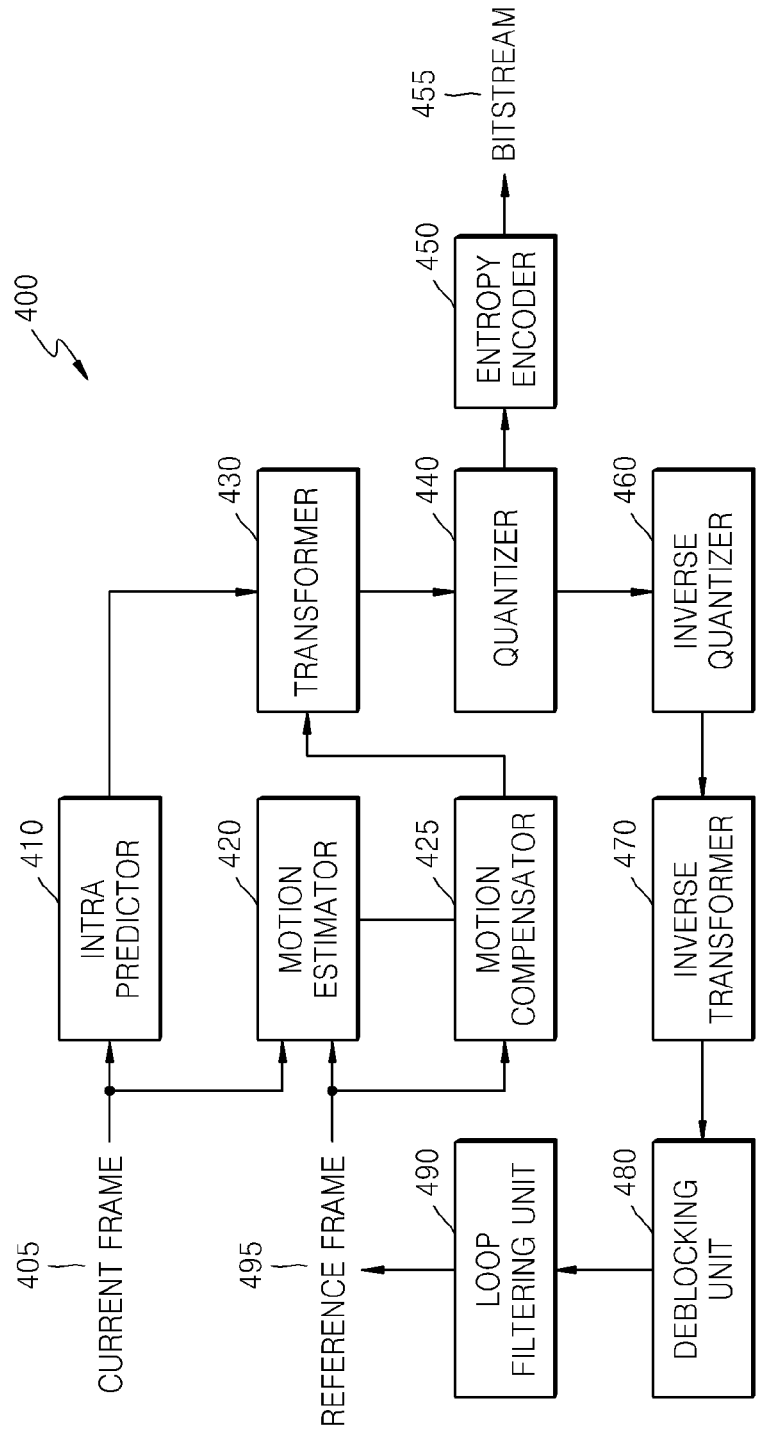
FIG. 4 is a block diagram of an image encoder based on coding units, according to an exemplary embodiment.

FIG. 4 is a block diagram of an image encoder 400 based on coding units, according to an exemplary embodiment.

The image encoder 400 may correspond to the video encoding apparatus 100. An intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490 (e.g., loop filterer). The quantized transformation coefficient may be output as a bitstream 455 through an entropy encoder 450.

The intra predictor 410, the motion estimator 420, the motion compensator 425, the transformer 430, the quantizer 440, the inverse quantizer 460, the inverse transformer 470, the deblocking unit 480, and the loop filtering unit 490 of the image encoder 400 may operate while considering coding units having a tree structure of each maximum coding unit.

In particular, the deblocking unit 480 determines filtering boundaries to be deblocking-filtered based on coding units having a tree structure and a maximum size of the coding units, determines a filtering strength at the filtering boundaries based on pixel values of pixels adjacent to the filtering boundaries, and performs deblocking filtering based on the filtering strength.

Figure 5:
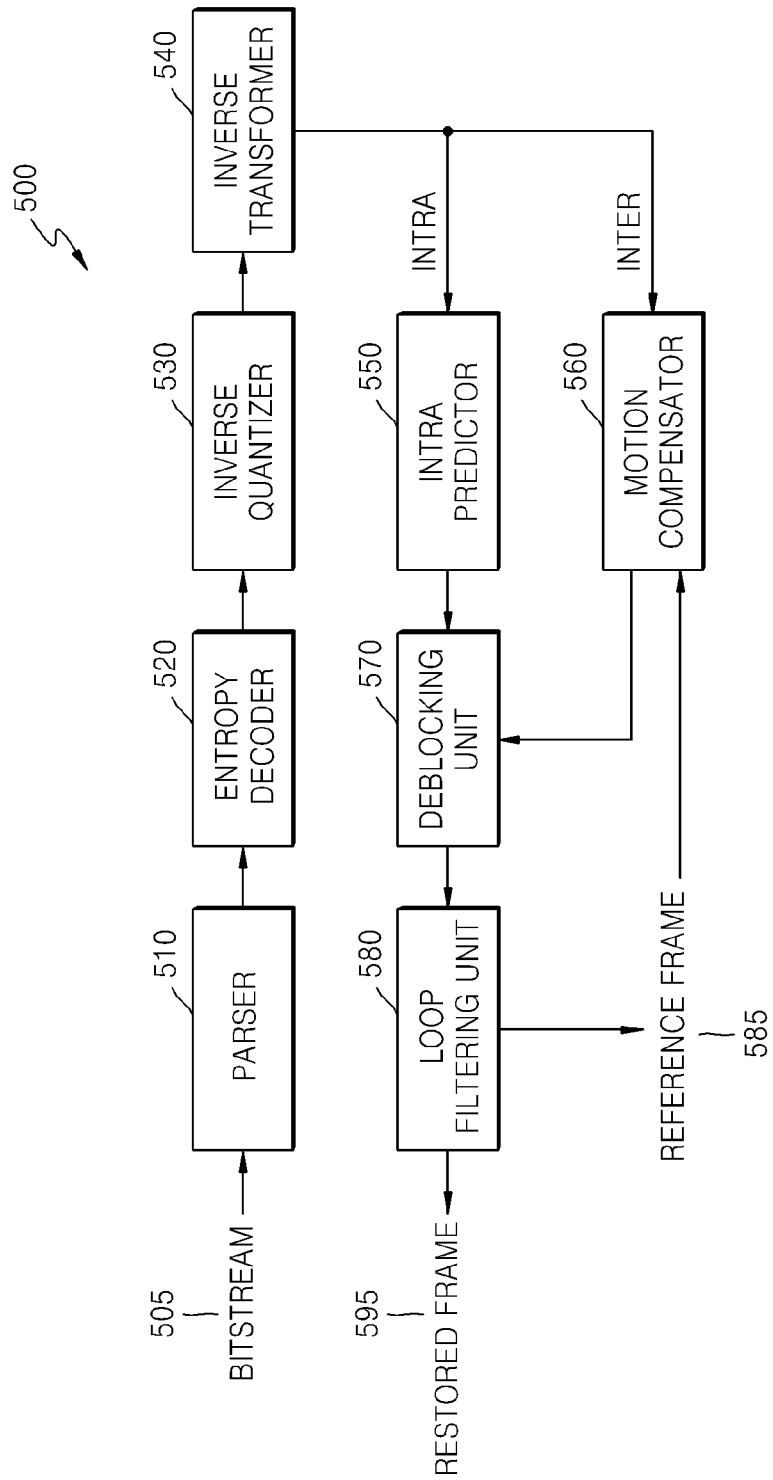
FIG. 5 is a block diagram of an image decoder based on coding units, according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580 (e.g., loop filterer). Also, the image data that is post-processed through the deblocking unit 570 and the loop filtering unit 580 may be output as the reference frame 585.

In order to decode the image data in the decoding unit 220 of the video decoding apparatus 200, the image decoder 500 may perform operations that are performed after the parser 510.

Since the image decoder 500 corresponds to the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

In particular, the deblocking unit 570 determines filtering boundaries to be deblocking-filtered which are from among boundaries of at least one of data units including the coding units having the tree structure, the prediction units, and the transformation units, determines a filtering strength at the filtering boundaries based on pixel values of pixels adjacent to the filtering boundaries, and performs deblocking filtering on the decoded image data based on the filtering strength. Detailed operations regarding the deblocking filtering will be described in detail with reference to FIG. 14 and thereafter.

Figure 6:
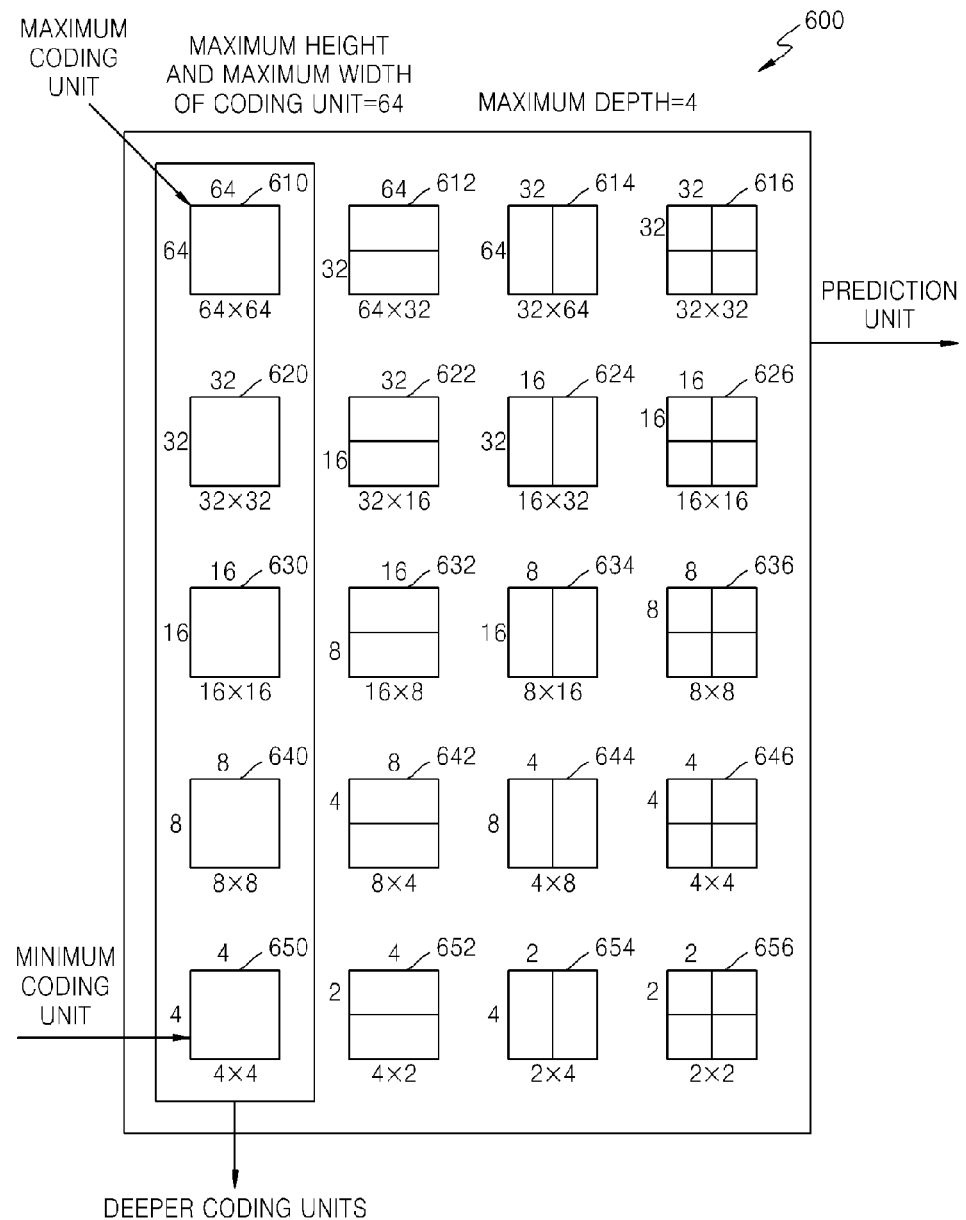
FIG. 6 is a diagram illustrating deeper coding units according to depths, and partitions, according to an exemplary embodiment.

FIG. 6 is a diagram illustrating deeper coding units according to depths, and partitions, according to an exemplary embodiment.

The video encoding apparatus 100 and the video decoding apparatus 200 use coding units that are independently determined according to each region so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure of coding units 600, according to an exemplary embodiment, the maximum height and the maximum width of the coding units are each 64, and the maximum depth is 5. The maximum depth of the coding units 600 of FIG. 6 indicates a total number of depth levels from a maximum coding unit to a minimum coding unit.

Since a depth deepens along a vertical axis of the hierarchical structure of coding units 600, a height and a width of the deeper coding unit are each split. Also, prediction units (or partitions), which are bases for prediction encoding of each deeper coding unit, are shown along a horizontal axis of the hierarchical structure of coding units 600.

In other words, a coding unit 610 is a maximum coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The partitions, which are the prediction unit of a coding unit, are arranged along the horizontal axis according to each depth. In other words, a prediction unit of the coding unit 610 having the size of 64×64 and the depth of 0 may be partitions included in the encoding unit 610, i.e., a partition 610 having a size of 64×64, partitions 612 having the size of 64×32, partitions 614 having the size of 32×64, and partitions 616 having the size of 32×32. Conversely, the coding unit may be a data unit having a square shape and a minimum size which includes the prediction units 610, 612, 614, and 616.

Similarly, a prediction unit of the coding unit 620 having the size of 32×32 and the depth of 1 may be partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be partitions included in the coding unit 640, i.e., a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth, and a prediction unit of the coding unit 650 having the size of 4×4 may be a partition 650 having a size of 4×4, partitions 652 having a size of 4×2, partitions 654 having a size of 2×4, and partitions 656 having a size of 2×2.

In order to determine a coded depth of the coding units constituting the maximum coding unit 610, the coding unit determiner 110 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a prediction unit having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an exemplary embodiment.

The video encoding apparatus 100 may encode and transmit information 800 about a partition type, information 810 about a prediction mode, and information 820 about a size of a transformation unit for each coding unit corresponding to a coded depth, as information about an encoding mode with respect to coding units having a tree structure.

The information 800 indicates information about a type of a partition obtained by splitting a current coding unit, wherein the partition is a prediction unit (a partition) for prediction encoding the current coding unit. For example, a current coding unit CU_0 having a depth of 0 and a size of 2N×2N may be split into any one of a prediction unit 802 having a size of 2N×2N, a prediction unit 804 having a size of 2N×N, a prediction unit 806 having a size of N×2N, and a prediction unit 808 having a size of N×N. Here, the information 800 about a partition type is set to indicate one of the prediction unit 802 having a size of 2N×2N, the prediction unit 804 having a size of 2N×N, the prediction unit 806 having a size of N×2N, and the prediction unit 808 having a size of N×N.

The information 810 indicates a prediction mode of a prediction unit. For example, the information 810 may indicate a mode of prediction encoding performed on a prediction unit indicated by the information 800, i.e., an intra mode 812, an inter mode 814, or a skip mode 816.

Figure 9:
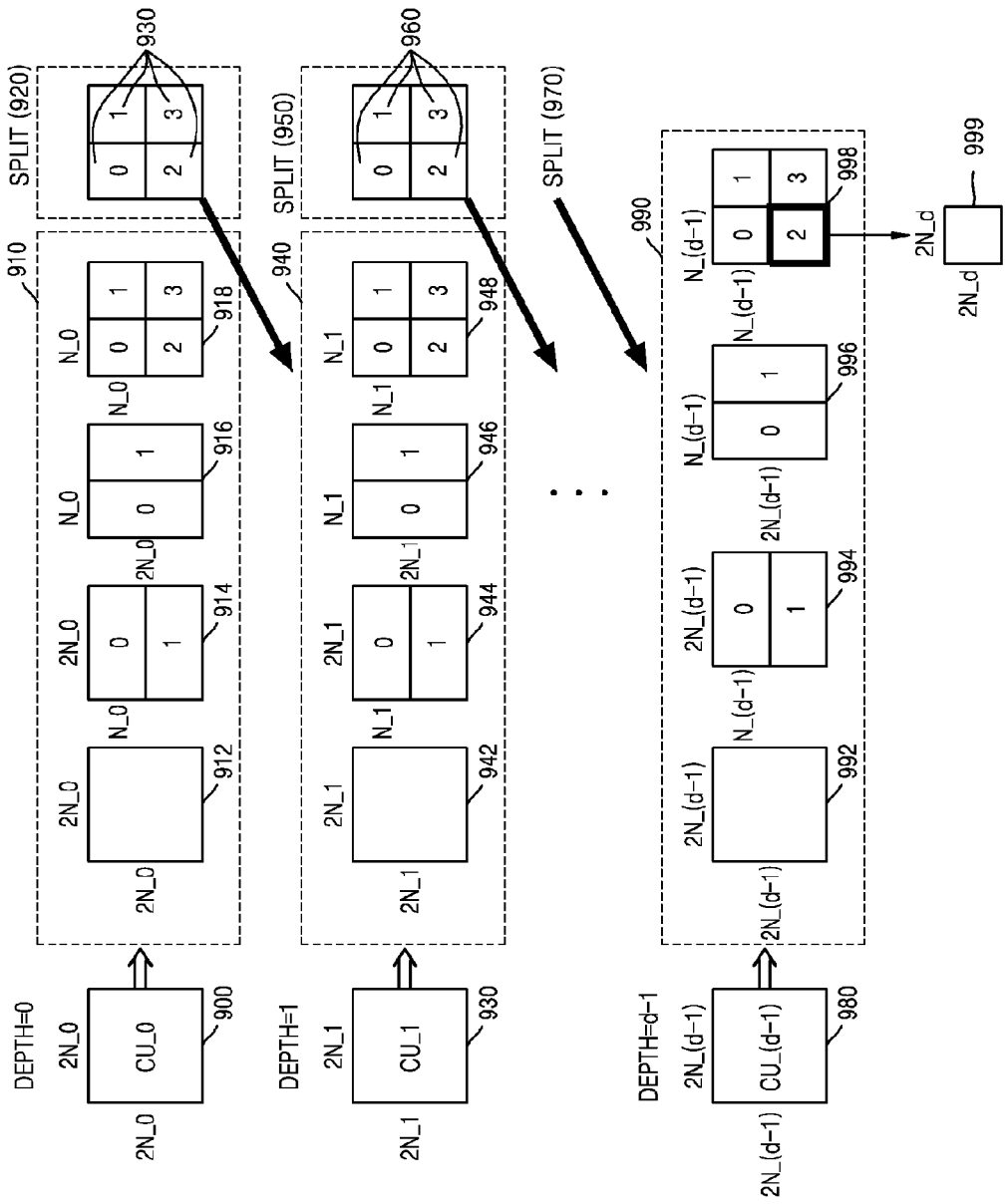
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the coding unit 900, but a partition type is not limited thereto.

Prediction encoding is repeatedly performed on one prediction unit having a size of 2N_0×2N_0, two prediction units having a size of 2N_0×N_0, two prediction units having a size of N_0×2N_0, and four prediction units having a size of N_0×N_0, according to each partition type. The prediction encoding in an intra mode and an inter mode may be performed on the prediction units having the sizes of 2N_0×2N_0, N_0×2N_0, 2N_0×N_0, and N_0×N_0. The prediction encoding in a skip mode is performed only on the prediction unit having the size of 2N_0×2N_0.

If an encoding error is smallest in one of the partition types 912 through 916 having the sizes of 2N_0×2N_0, 2N_0×N_0, and N_0×2N_0, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1. If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, coding units according to each depth may be set up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one prediction unit having a size of 2N_(d−1)×2N_(d−1), two prediction units having a size of 2N_(d−1)×N_(d−1), two prediction units having a size of N_(d−1)×2N_(d−1), four prediction units having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, and the prediction unit of a corresponding depth may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and may decode encoded data of a corresponding coding unit by using information about an encoding mode of the corresponding depth.

Figure 10:
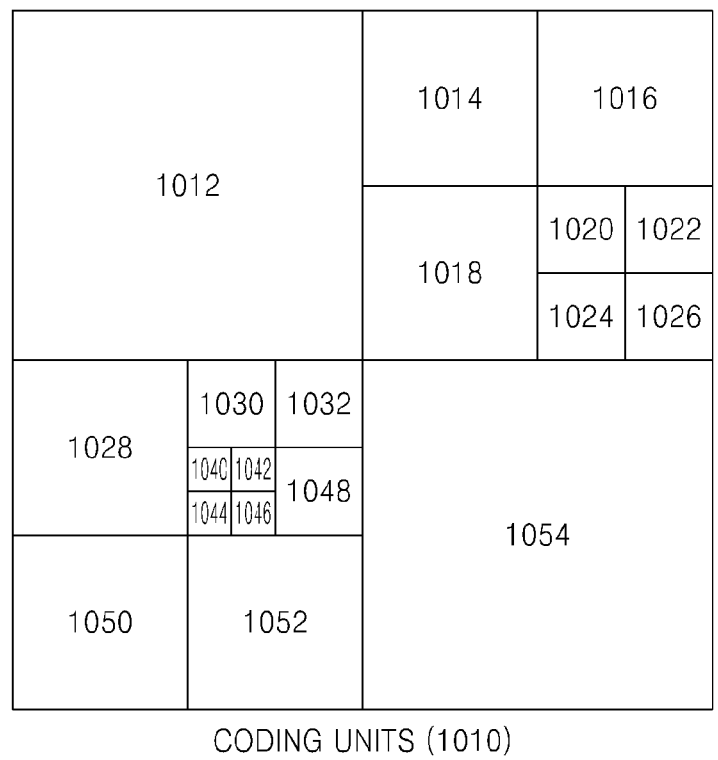
FIGS. 10 through 12 are diagrams for describing a relationship between coding units, prediction units, and transformation units, according to an exemplary embodiment.
Figure 11:
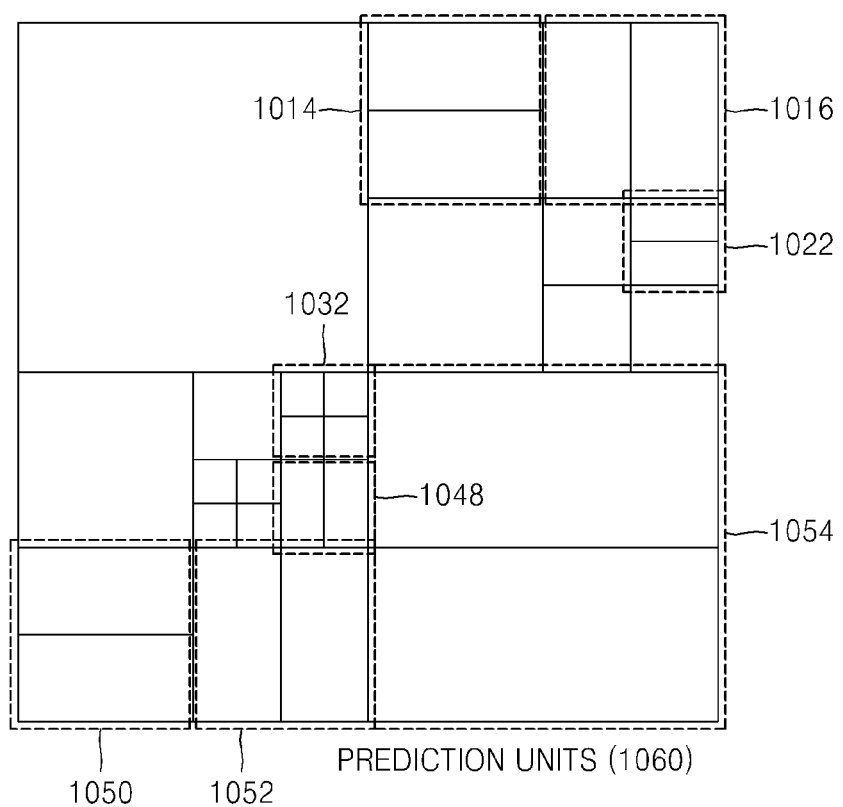
Figure 12:
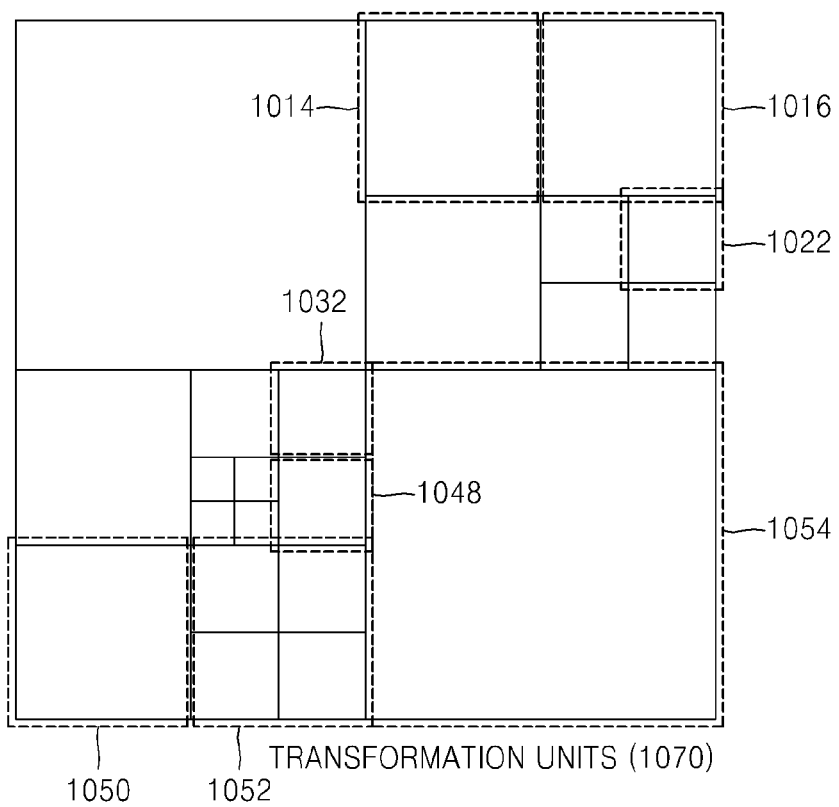

FIGS. 10 through 12 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a current maximum coding unit. The prediction units 1060 are prediction units of each of the coding units 1010, and the transformation units 1070 are transformation units of each of the coding units 1010.

When a depth of a maximum coding unit is 0 in the coding units 1010, the coding units 1010 include coding units 1012 and 1054 having a depth of 1, coding units 1014, 1016, 1018, 1028, 1050, and 1052 having a depth of 2, coding units 1020, 1022, 1024, 1026, 1030, 1032, and 1048 having a depth of 3, and coding units 1040, 1042, 1044, and 1046 having a depth of 4.

In the prediction units 1060, some encoding units 1014, 1016, 1022, 1032, 1048, 1050, 1052, and 1054 are obtained by splitting the coding units in the encoding units 1010. In other words, prediction units in the coding units 1014, 1022, 1050, and 1054 are partition types having a size of 2N×N, prediction units in the coding units 1016, 1048, and 1052 are partition types having a size of N×2N, and the prediction unit 1032 is a partition type having a size of N×N. That is, the prediction units of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, a transformation unit and a prediction unit of one coding unit are separately determined. Thus, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained.

Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| | Split Information 0 (Encoding on Coding Unit having Size of 2N × 2N and Current Depth of d) | | | | Split Information 1 |
|---|---|---|---|---|---|
| | | | Size of Transform unit | | |
| | Partition Type | | Split Information 0 of Transform unit | Split Information 1 of Transform unit | |
| Prediction Mode | Symmetrical Partition Type | Asymmetrical Partition Type | | | |
| Intra2 Inter Skip (Only | 2N × 2N 2N × N N × 2N N × N | 2N × nU 2N × nD nL × 2N nR × 2N | 2N × 2N | N × N (Symmetrical Type) N/2 × N/2 | Repeatedly Encode Coding Units having Lower |

TABLE 1-continued

Split Information 0
(Encoding on Coding Unit having Size of
2N × 2N and Current Depth of d)

| Prediction Mode | Partition Type | | Size of Transform unit | | Split Information 1 |
|---|---|---|---|---|---|
| | Symmetrical Partition Type | Asymmetrical Partition Type | Split Information 0 of Transform unit | Split Information 1 of Transform unit | |
| 2N × 2N) | | | | (Asymmetrical Type) | Depth of d + 1 |

The transmission unit 120 of the video encoding apparatus 100 may output the encoding information about the coding units having a tree structure, and the receiving and extracting unit 210 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If split information of a current depth d is 1, the current coding unit is further split according to the split information, so that encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types according to split information of the transformation unit. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information. Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
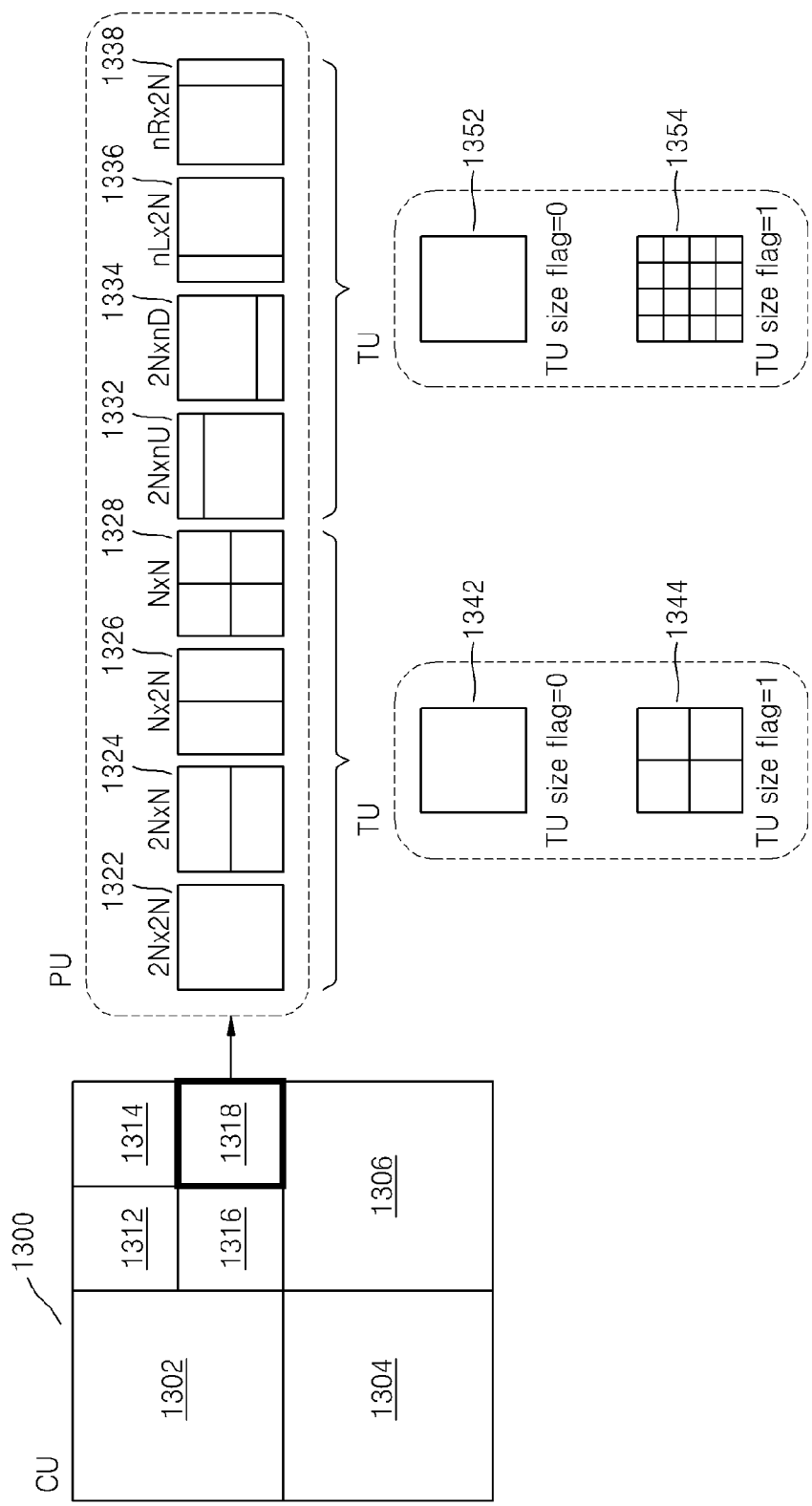
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of a prediction unit of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e., the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Figure 14:
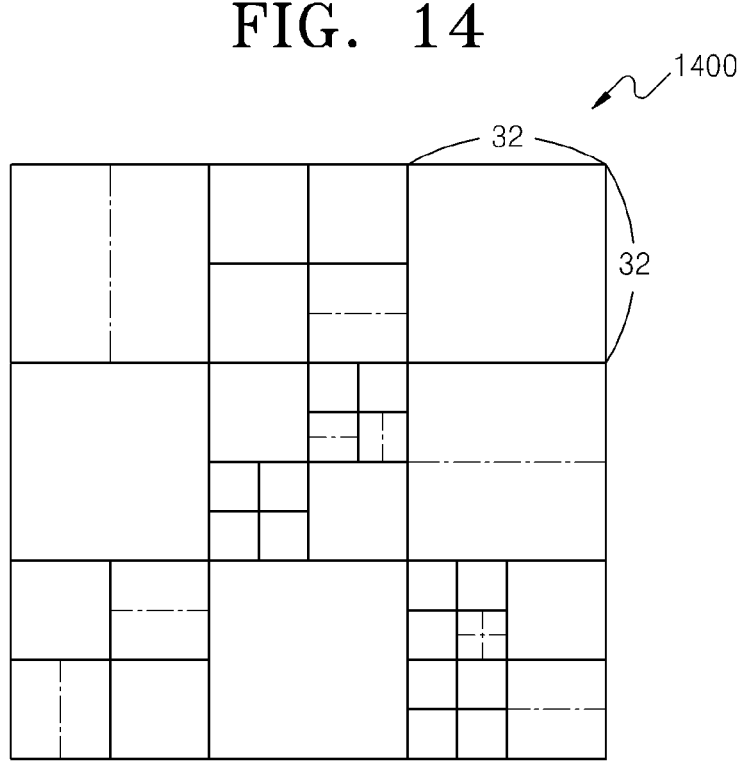
FIG. 14 illustrates maximum coding units, coding units according to a tree structure which are obtained by splitting each maximum coding unit, and data units including prediction units and transformation units which are obtained by splitting each coding unit, according to an exemplary embodiment.

FIG. 14 illustrates maximum coding units, coding units according to a tree structure which are obtained by splitting each maximum coding unit, and data units including prediction units and transformation units which are obtained by splitting each coding unit, according to an exemplary embodiment. That is, in FIG. 14, data units including all of coding units, prediction units, and transformation units shown in FIGS. 10 through 12 are illustrated in an overlapping manner. In FIG. 14, a size of each maximum coding unit is 32×32, coding units corresponding to a coded depth are illustrated by using a solid line, and prediction units and transformation units obtained by splitting each coding unit not corresponding to the coded depth are illustrated in each coding unit by using a dotted line. Also, it is assumed that the coded depths of the coding units according to the tree structure are 0, 1, and 2, and a maximum depth is set to 3.

Referring to FIG. 14, data units 1400 include coding units corresponding to the coded depths of 9 maximum coding units having a size of 32×32. As described above, encoding is recursively performed for each maximum coding unit by using the coding units having a hierarchical structure according to the depths, so that an optimum coding unit may be determined, and an optimum prediction unit and an optimum transformation unit for prediction and transformation of each coding unit may be determined. The deblocking filtering unit 130 determines filtering boundaries to be deblocking-filtered based on at least one of data units including the coding units, the prediction units, and the transformation units as illustrated in FIG. 14.

In more detail, the deblocking filtering unit 130 may determine the filtering boundaries based on boundaries of the data units among the coding units, the prediction units, and the transformation units that have a size equal to or greater than a predetermined size. In other words, referring to FIG. 14, when it is assumed that a current picture is split into the maximum coding units having a size of 32×32, each maximum coding unit is split into the coding units having the hierarchical structure according to the depths, and each coding unit is split into prediction units and transformation units that are smaller than the coding units corresponding to the coded depths, only boundaries of the data units including the coding units, the prediction units, and the transformation units and having a size equal to or greater than a predetermined size may be determined as filtering boundaries to be deblocking-filtered.

Figure 15:
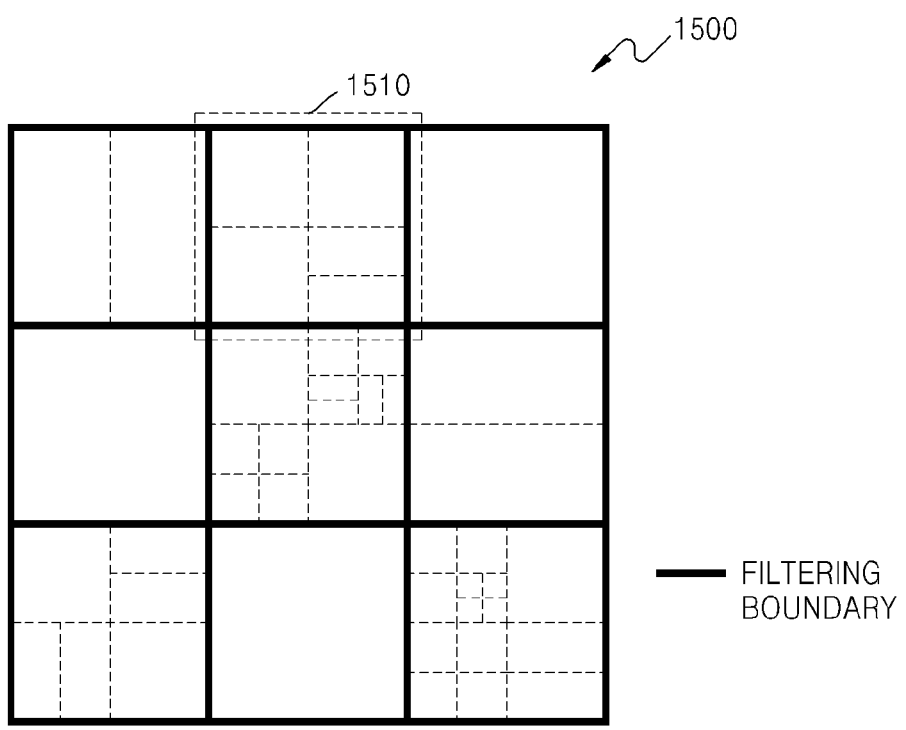
FIGS. 15 through 17 illustrate filtering boundaries determined based on boundaries of the data units of FIG. 14 that have a size equal to or greater than a predetermined size.
Figure 16:
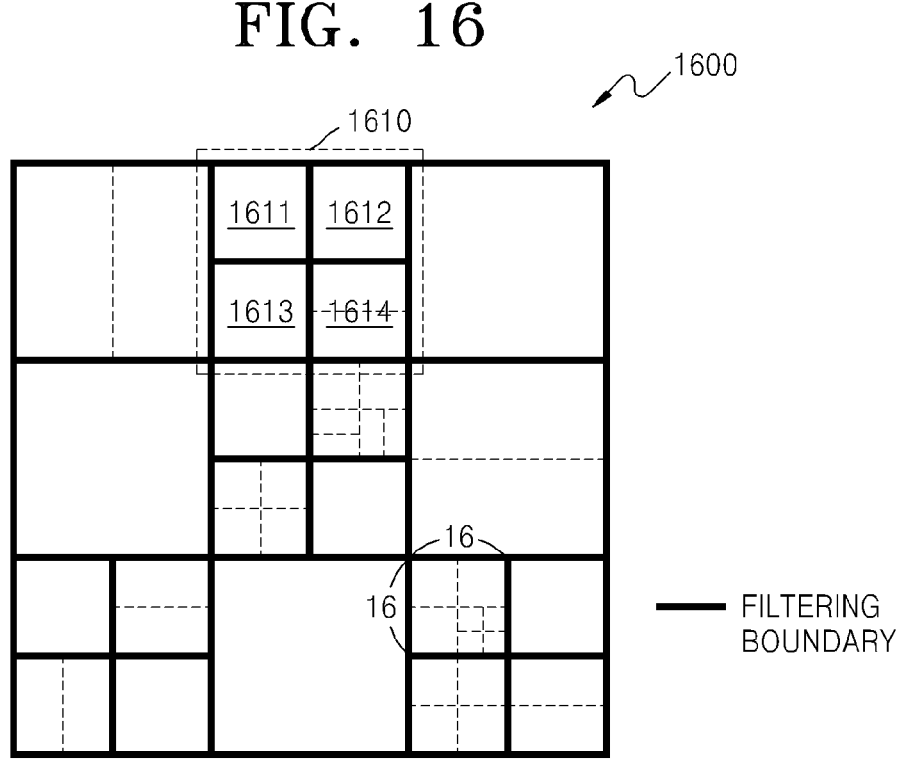
Figure 17:
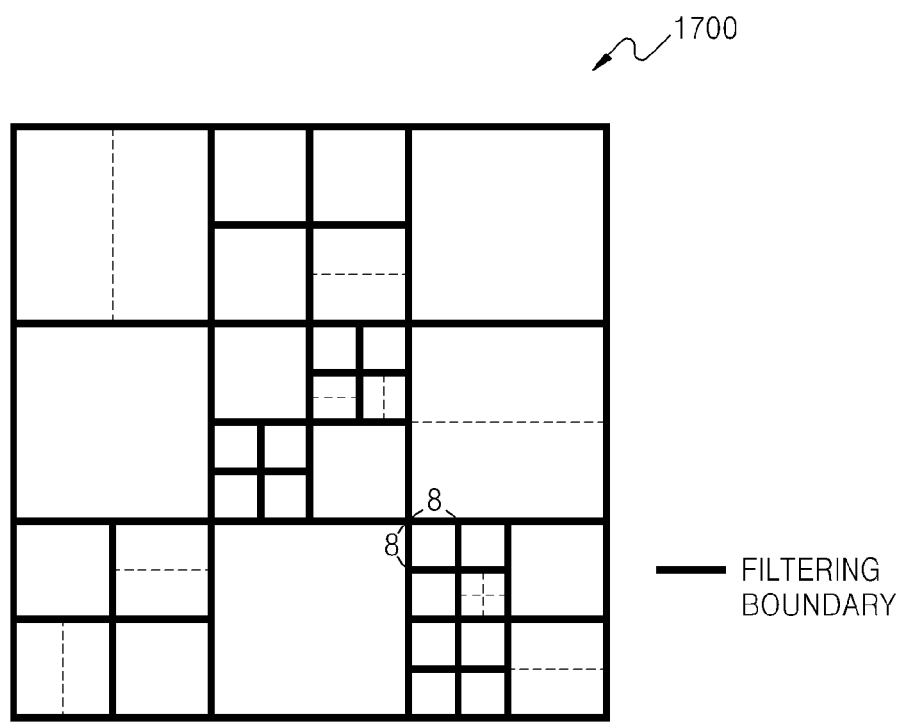

FIGS. 15 through 17 illustrate filtering boundaries determined based on the boundaries of the data units of FIG. 14 that have a size equal to or greater than a predetermined size.

Referring to FIGS. 14 and 15, when the coding units, the prediction units, and the transformation units of FIG. 14 are determined, the deblocking filtering unit 130 may determine only boundaries of data units that have a size equal to or greater than a predetermined size and that are from among the coding units, the prediction units, and the transformation units, as filtering boundaries to be deblocking-filtered. For example, as illustrated in FIG. 15, the deblocking filtering unit 130 may determine only boundaries of the coding units, the prediction units, and the transformation units whose size is equal to or greater than 32×32, as the filtering boundaries to be deblocking-filtered, as illustrated in FIG. 16, the deblocking filtering unit 130 may determine only boundaries of the coding units, the prediction units, and the transformation units whose size is equal to or greater than 16×16, as the filtering boundaries to be deblocking-filtered, or as illustrated in FIG. 17, the deblocking filtering unit 130 may determine only boundaries of the coding units, the prediction units, and the transformation units whose size is equal to or greater than 8×8, as the filtering boundaries to be deblocking-filtered. In this manner, when only the boundaries of the data unit having a size equal to or greater than a predetermined size are determined as the filtering boundaries to be deblocking-filtered, filtering boundaries to be filtered are changed in the same split shapes. For example, as illustrated in FIG. 15, when it is assumed that deblocking filtering is performed only on boundaries of data units whose size is equal to or greater than 32×32, inner boundaries of a maximum coding unit 1510, which are from among boundaries of coding units, transformation units, and prediction units obtained by splitting the maximum coding unit 1510 having a size of 32×32, are not considered as filtering boundaries, except for boundaries overlapping those of the maximum coding unit 1510 having a size of 32×32. On the other hand, as illustrated in FIG. 16, in a case where deblocking filtering is performed only on boundaries of data units whose size is equal to or greater than 16×16, inner boundaries of coding units 1611 through 1614 obtained by splitting a maximum coding unit 1610 corresponding to the maximum coding unit 1510 of FIG. 15 are also determined as filtering boundaries.

However, although boundaries of data units have a size equal to or greater than a predetermined size, if the boundaries correspond to a frame boundary, the deblocking filtering unit 130 does not determine the boundaries as filtering boundaries. That is, the deblocking filtering is not performed on outermost boundaries that correspond to side edges of a picture.

As described above, the deblocking filtering unit 130 may determine the filtering boundaries not only based on the boundaries of the data units having a size equal to or greater than a predetermined size but may also determine the filtering boundaries to be deblocking-filtered based on predetermined syntax indicating whether to perform filtering on boundaries of data units having a random size according to coding units, picture units, or slice units. Also, similar to the deblocking filtering unit 130 of FIG. 1, the deblocking filtering unit 230 of FIG. 2 may also determine filtering boundaries based on boundaries of data units having a size equal to or greater than a predetermined size, or may determine filtering boundaries to be deblocking-filtered based on syntax information regarding deblocking which is included in a received bitstream and is set according to coding units, picture units, or slice units.

In a coding method based on a coding unit (hereinafter, referred to as 'block'), an image including distortion that has occurred in a block boundary is referred to when another image is encoded, such that image deterioration may be propagated without a change. Thus, as described above, the deblocking filtering unit 130 or 230 performs deblocking filtering so as to decrease a blocking artifact. However, the deblocking filtering process requires a huge amount of calculation, thereby consuming many resources of an encoder or a decoder. Therefore, in general, the deblocking filtering is performed only on block boundaries selected according to a predetermined determination standard. For example, in a H.264 encoding method according to the related art, a boundary strength is determined based on a prediction mode of a block including pixels adjacent to a block boundary, and a transformation coefficient value in the block including the pixels adjacent to the block boundary, and then whether the deblocking filtering is on or off is determined based on the boundary strength.

According to an exemplary embodiment, whether to perform deblocking filtering, or a filtering strength is determined by using a parameter indicating how close pixel values of pixels adjacent to a filtering boundary are with respect to a predetermined line. Hereinafter, an adaptive filtering method according to exemplary embodiments will now be described with reference to FIGS. 18 through 21.

Figure 18:
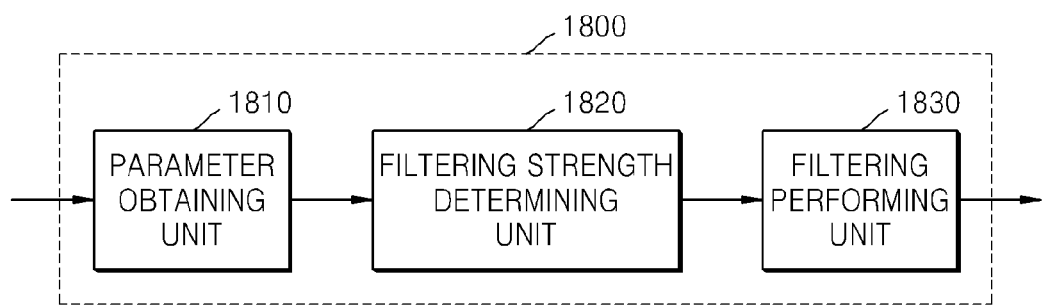
FIG. 18 is a block diagram of an adaptive filtering apparatus, according to an exemplary embodiment.

FIG. 18 is a block diagram of an adaptive filtering apparatus 1800, according to an exemplary embodiment. The adaptive filtering apparatus 1800 corresponds to the deblocking filtering unit 130 of the video encoding apparatus 100 in FIG. 1, and the deblocking filtering unit 230 of the video decoding apparatus 200 in FIG. 2.

Referring to FIG. 18, the adaptive filtering apparatus 1800 includes a parameter obtaining unit 1810 (e.g., parameter obtainer), a filtering strength determining unit 1820 (e.g., filtering strength determiner), and a filtering performing unit 1830 (e.g., filtering performer).

The parameter obtaining unit 1810 obtains a parameter indicating how close pixel values of pixels adjacent to a filtering boundary are with respect to a predetermined curve. The curve may be expressed as a random function such as a polynomial, and for example, the curve may be a line. Hereinafter, it is assumed that the curve is a line, but the one or more exemplary embodiments are not limited thereto and may be applied to one of random curves. For example, in a case where the pixel values of the pixels adjacent to the filtering boundary monotonously increase or decrease, it may be assumed that the pixel values of the pixels adjacent to the filtering boundary are in a straight line. In this manner, the parameter obtaining unit 1810 refers to a change in the pixel values of the pixels adjacent to the filtering boundary and then obtains the parameter indicating whether the pixel values of the pixels adjacent to the filtering boundary are close to a predetermined line. Specifically, the parameter obtaining unit 1810 may obtain the parameter based on a difference between pixel values of pixels that are symmetrically positioned with respect to a block boundary, and a difference between slopes that are determined according to distances between the pixels that are symmetrically positioned. Operations and the parameter obtained by the parameter obtaining unit 1810 will be described in detail with reference to FIGS. 19 and 20.

The filtering strength determining unit 1820 determines the filtering strength at the block boundary based on the parameter obtained by the parameter obtaining unit 1810. The filtering strength determining unit 1820 refers to a result of comparison between the parameter and a predetermined threshold value, and if the pixel values of the pixels adjacent to the filtering boundary are close to a predetermined line, the filtering strength determining unit 1820 applies deblocking filtering having a low filtering strength, or may determine the filtering strength so as to allow an operation for the deblocking filtering to be in an off state, i.e., to be skipped.

The filtering performing unit 1830 performs the deblocking filtering on the pixels adjacent to the filtering boundary based on the filtering strength determined by the filtering strength determining unit 1820.

Figure 19A:
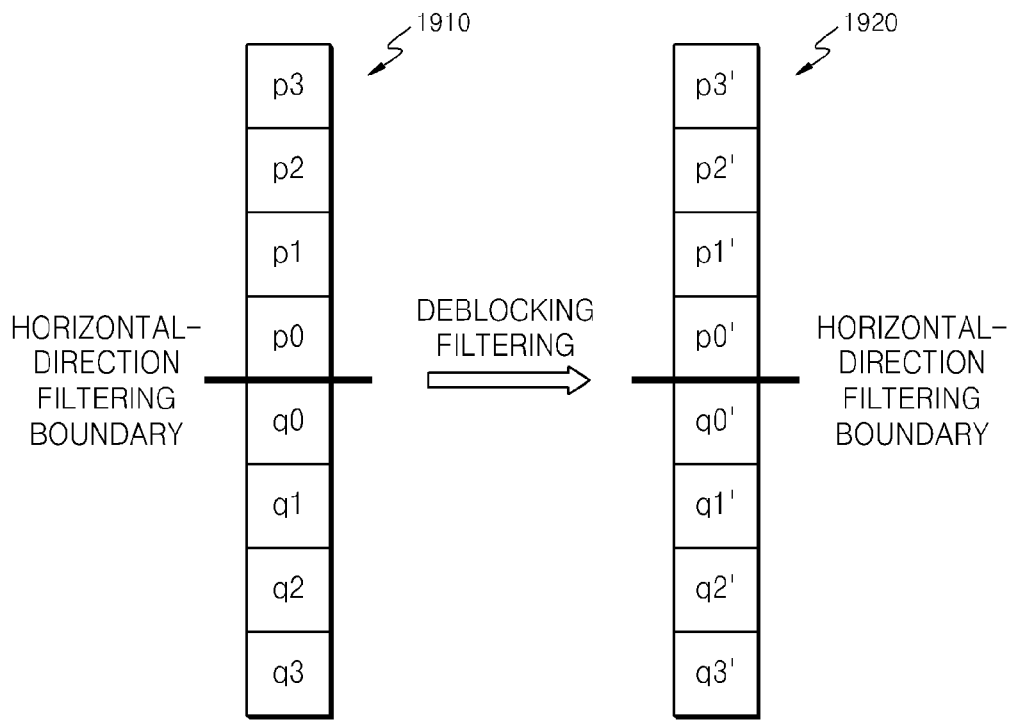
FIGS. 19A and 19B illustrate pixels adjacent to a filtering boundary in order to describe deblocking filtering, according to an exemplary embodiment.
Figure 19B:
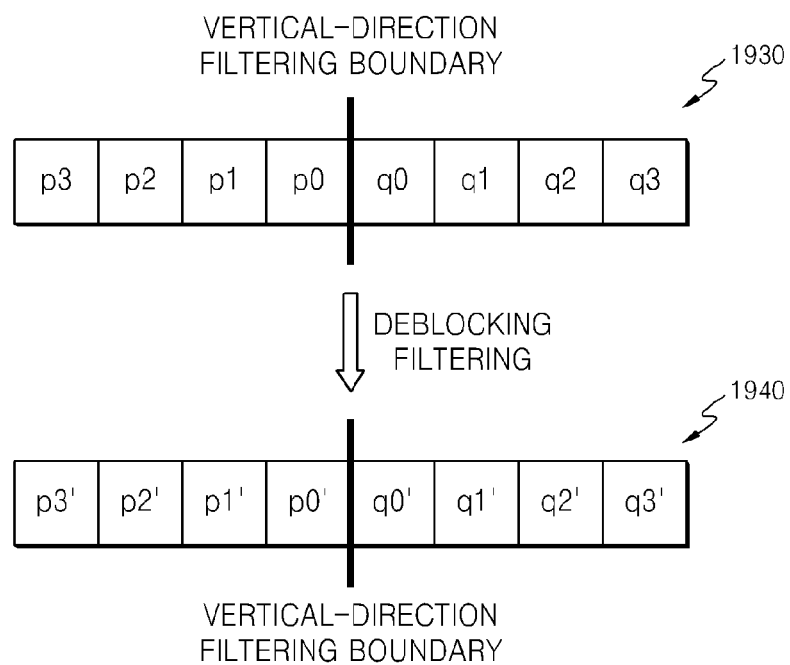

FIGS. 19A and 19B illustrate pixels adjacent to a filtering boundary in order to describe deblocking filtering, according to an exemplary embodiment.

Referring to FIG. 19A, pixel values of pixels that are upwardly and downwardly positioned with respect to a horizontal-direction filtering boundary before deblocking filtering is performed thereon are defined as p0 through p4 and q0 through q4 (refer to reference numeral 1910 of FIG. 19A). Also, pixel values of the pixels that are upwardly and downwardly positioned with respect to the horizontal-direction filtering boundary after the deblocking filtering is performed thereon are defined as p0' through p4' and q0' through q4' (refer to reference numeral 1920 of FIG. 19A). Similarly, referring to FIG. 19B, pixel values of pixels that are upwardly and downwardly positioned with respect to a vertical-direction filtering boundary before deblocking filtering is performed thereon are defined as p0 through p4 and q0 through q4 (refer to reference numeral 1930 of FIG. 19B). Also, pixel values of the pixels that are upwardly and downwardly positioned with respect to the vertical-direction filtering boundary after the deblocking filtering is performed thereon are defined as p0' through p4' and q0' through q4' (refer to reference numeral 1940 of FIG. 19B). The deblocking filtering with respect to the horizontal-direction filtering boundary, and the deblocking filtering with respect to the vertical-direction filtering boundary are the same except for a difference in directions. Hereinafter, a process of obtaining the parameter indicating how close pixel values of pixels (refer to FIGS. 19A and 19B) adjacent to a block boundary are with respect to a predetermined line will now be described in detail.

Figure 20A:
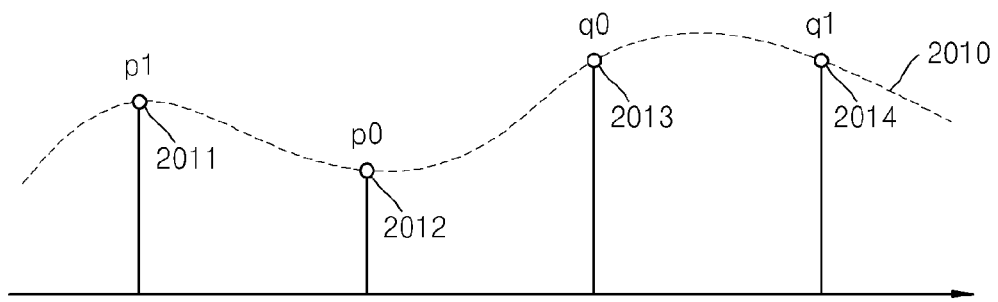
FIGS. 20A and 20B are reference views describing a process of obtaining a parameter by using pixel values of pixels adjacent to a block boundary, according to an exemplary embodiment.
Figure 20B:
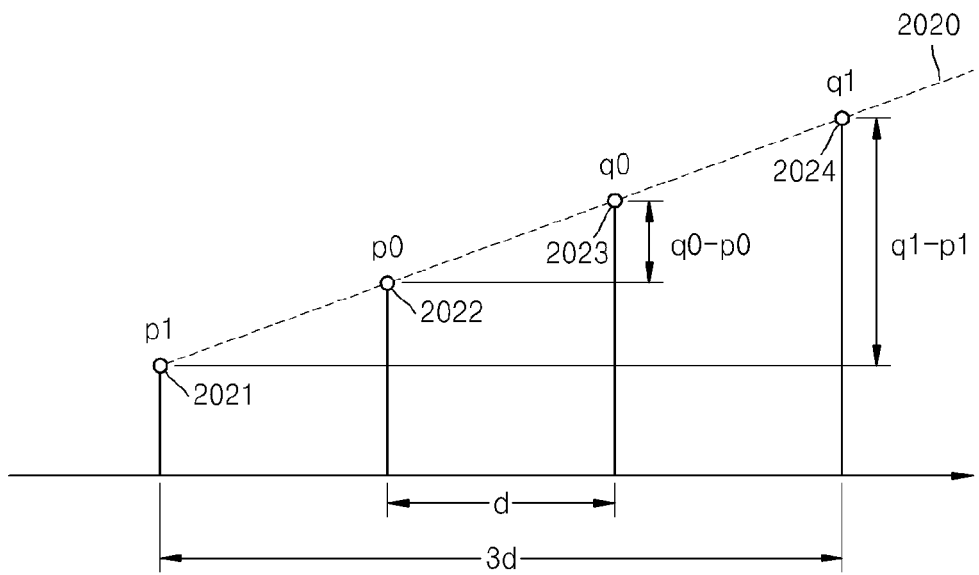

FIGS. 20A and 20B are reference views describing a process of obtaining a parameter by using pixel values of pixels adjacent to a block boundary, according to an exemplary embodiment.

When the pixels adjacent to a filtering boundary as shown in FIGS. 19A and 19B are arrayed with respect to the pixel values as shown in FIGS. 20A and 20B, how close the pixels adjacent to the filtering boundary are with respect to a predetermined line 2010 may be determined according to a difference between the pixel values. For example, as illustrated in FIG. 20B, when it is assumed that the predetermined line 2010 is a line 2020, and a distance between the pixels is d (here, d is a positive integer), a slope between a pixel value p0 and a pixel value q0 of pixels that are most-adjacent to the filtering boundary is $(q0-p0)/d$, and a slope between a pixel value p1 and a pixel value q1 of pixels that are secondly most-adjacent to the filtering boundary is $(q1-p1)/3d$. Whether the pixel values of the pixels adjacent to the filtering boundary are close to the virtual line 2020 of FIG. 20B may be determined by determining similarity of the slope between the pixel values p0 and q0 and the slope between the pixel values p1 and q1. Thus, the parameter obtaining unit 1810 may obtain the parameter based on the difference between the pixel values of the pixels that are symmetrically positioned with respect to the filtering boundary, and the difference between the slopes that are determined according to the distances between the pixels that are symmetrically positioned, wherein the parameter indicates how close the pixel values of the pixels adjacent to the filtering boundary are with respect to the line 2020.

Specifically, the parameter obtaining unit 1810 obtains a difference value between the slope between the pixel values p0 and q0 (i.e., $(q0-p0)/d$) and the slope between the pixel values p1 and q1 (i.e., $(q1-p1)/3d$). When d=1, the difference value between the slopes is $\{(q0-p0)-(q1-p1)/3\}$. The parameter obtaining unit 1810 multiplies the difference value by a predetermined constant value, e.g., 9/16, so that the parameter obtaining unit 1810 determines $\{9*(q0-p0)-3*(q1-p1)\}/16$ as a parameter $\Delta$ indicating whether the pixels adjacent to the filtering boundary are close to a predetermined line. The fact that an absolute value of the parameter $\Delta$ is small means that the slope between the pixel values p0 and q0 and the slope between the pixel values p1 and q1 are similar to each other, i.e., the pixels of the pixel values p0, p1, q0, and q1 are close to the line 2020. Thus, how close the pixel values of the pixels adjacent to the filtering boundary are with respect to the predetermined line may be determined based on the absolute value of the parameter $\Delta$.

As described above, when the parameter obtaining unit 1810 obtains the parameter $\Delta$, the filtering strength determining unit 1820 determines the filtering strength based on a result of comparison between the absolute value of the parameter $\Delta$ and a predetermined threshold value thr1. Here, the predetermined threshold value thr1 may be previously determined based on a quantization parameter (QP) used in quantization of blocks including the pixel values p0 and p0. When the absolute value of the parameter $\Delta$ is less than the predetermined threshold value thr1, the filtering strength determining unit 1820 may determine the filtering strength so as to allow the deblocking filtering to be performed at a low filtering strength or may allow the deblocking filtering to not be performed. Also, when the absolute value of the parameter $\Delta$ is less than the predetermined threshold value thr1, the filtering strength determining unit 1820 may determine the filtering strength so as to allow the deblocking filtering to be performed at a low filtering strength, and when the absolute value of the parameter $\Delta$ is greater than the predetermined threshold value thr1, the filtering strength determining unit 1820 may allow the deblocking filtering to not be performed. According to the result of comparison between the absolute value of the parameter $\Delta$ and the predetermined threshold value thr1, whether to skip the deblocking filtering or to which case the deblocking filtering at the low filtering strength is applied may be set according to necessities. The concept of the one or more exemplary embodiments is that the predetermined line and the parameter $\Delta$ may be used as syntax for determination of the filtering strength of the deblocking filtering, and the skipping operation.

The filtering performing unit 1830 performs the deblocking filtering based on the filtering strength determined by the filtering strength determining unit 1820. For example, when it is assumed that pixel values of pixels positioned in a first side with respect to a block boundary are p0 and p1, pixel values of pixels positioned in a second side with respect to the block boundary are q0 and q1, and the pixels having the pixel values of p0 and q0 are adjacent to the block boundary, if the parameter $\Delta$ is less than the predetermined threshold value thr1, the filtering performing unit 1830 may perform the deblocking filtering according to an algorithm as given below:

```
{
p0'=p0+Δ;
q0'=q0−Δ;
Δp1=(p0−2*p1+p2+2*Δ)/4;
p1'=p1+Δp1;
Δq1=(q0−2*q1+q2−2*Δ)/4;
q1'=q1+Δq1
}
```

Figure 21:
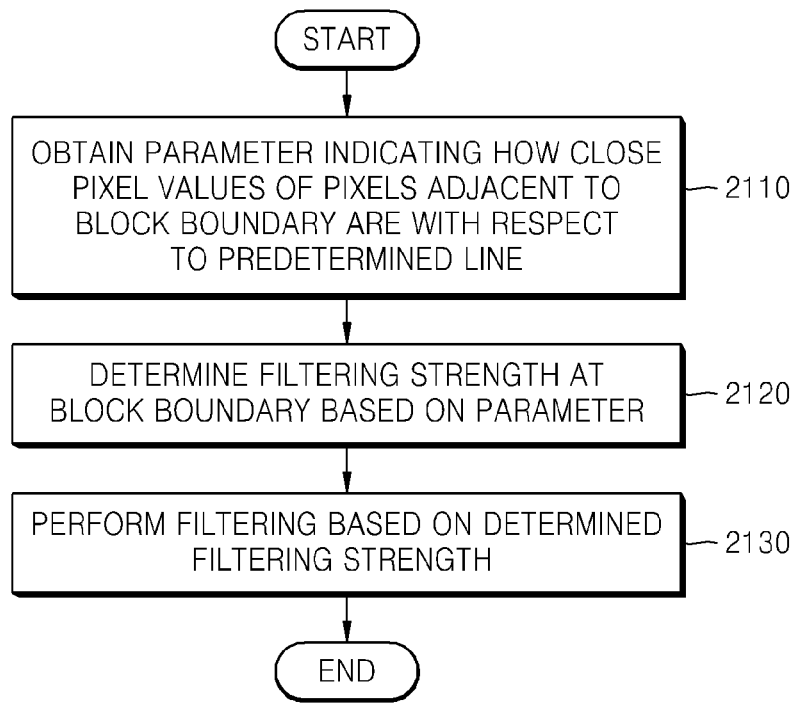
FIG. 21 is a flowchart illustrating an adaptive filtering method, according to an exemplary embodiment.

FIG. 21 is a flowchart illustrating an adaptive filtering method, according to an exemplary embodiment.

Referring to FIG. 21, in operation 2110, the parameter obtaining unit 1810 obtains a parameter indicating how close pixel values of pixels adjacent to a block boundary are with respect to a predetermined line. As described above, a straight line may be used as the predetermined line. In a case where the straight line is used as the predetermined line, the parameter obtaining unit 1810 obtains the parameter based on a difference value of slopes between pixels that are symmetrically positioned with respect to the block boundary. As described above, when it is assumed that the pixel values of the pixels positioned in the first side with respect to the block boundary are p0 and p1, the pixel values of the pixels positioned in the second side with respect to the block boundary are q0 and q1, the pixels having the pixel values of p0 and q0 are adjacent to the block boundary, and the parameter is $\Delta$, the parameter obtaining unit 1810 may obtain the parameter $\Delta$ by using Equation $\Delta(9*(q0-p0)-3*(q1-p1))/16$.

In operation 2120, the filtering strength determining unit 1820 determines a filtering strength at the block boundary based on the obtained parameter. As described above, the filtering strength determining unit 1820 compares an absolute value of the parameter with a predetermined threshold value, and if the absolute value of the parameter is less than the predetermined threshold value, the filtering strength determining unit 1820 may determine that the deblocking filtering is to be performed at a low filtering strength or the deblocking filtering is not to be performed.

In operation 2130, the filtering performing unit 1830 performs the deblocking filtering based on the determined filtering strength.

In the adaptive filtering method according to the present exemplary embodiment, the parameter is determined by using pixel values of four pixels adjacent to the block boundary. However, the number of pixels used in the determination of the parameter may be changed according to necessity.

According to the adaptive filtering method and apparatus according to exemplary embodiments, when pixel values of pixels adjacent to the block boundary are close to the predetermined line, the deblocking filtering is performed at a low filtering strength or the deblocking filtering is skipped, so as to prevent deterioration of image quality due to unnecessary filtering processing.

Figure 22A:
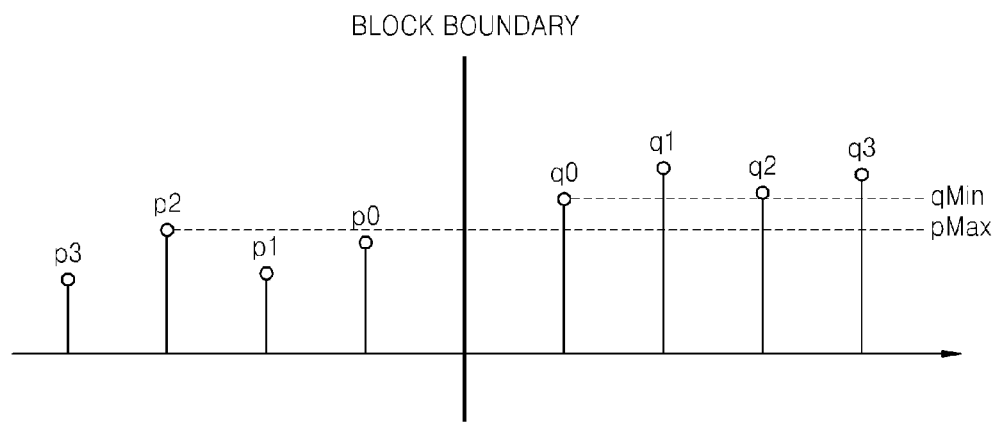
FIGS. 22A and 22B are reference views illustrating an adaptive filtering method, according to another exemplary embodiment.
Figure 22B:
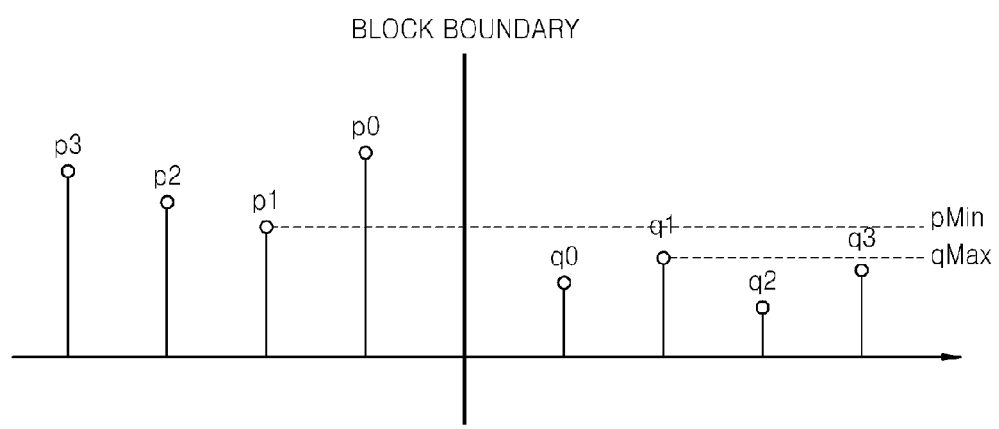

FIGS. 22A and 22B are reference views illustrating an adaptive filtering method, according to another exemplary embodiment.

In the adaptive filtering method according to the previously-described exemplary embodiment, the filtering strength of the deblocking filtering or whether to skip the deblocking filtering is determined based on the parameter indicating how close the pixel values of the pixels adjacent to the block boundary are with respect to the predetermined line. In the adaptive filtering method according to the present exemplary embodiment, whether to perform the deblocking filtering at a high filtering strength is determined by comparing maximum values and minimum values of adjacent pixels that are positioned in both sides of the block boundary.

Referring to FIGS. 22A and 22B, the deblocking filtering unit 130 or 230 calculates the maximum values and the minimum values of pixel values of the adjacent pixels that are positioned in both sides of the block boundary. In a case where four pixels in both left and right sides of the block boundary, i.e., total 8 adjacent pixels are used as illustrated in to FIGS. 22A and 22B, a maximum value and a minimum value from among pixel values of adjacent pixels p0 through p3 in the left side are defined as pMax and pMin, respectively, and a maximum value and a minimum value from among pixel values of adjacent pixels q0 through q3 in the right side are defined as qMax and qMin. Here, the deblocking filtering unit 130 or 230 compares pMax and qMin, and qMax and pMin, and if pMax<qMin is satisfied as illustrated in FIG. 22A, or if qMax<pMin is satisfied as illustrated in FIG. 22B, that is, if all of pixel values in one side of the block boundary are less than pixel values in the other side, the deblocking filtering unit 130 or 230 may determine that the deblocking filtering is to be performed at a high filtering strength.

If a condition for the strong deblocking filtering is not satisfied, the deblocking filtering unit 130 or 230 may determine the parameter $\Delta$ and then may determine whether to perform the deblocking filtering at a low filtering strength or to skip the deblocking filtering, as described in the previously-described exemplary embodiment.

One or more exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc. Moreover, it is understood that in exemplary embodiments, one or more units or elements of the above-described apparatuses can include circuitry, a processor, a microprocessor, etc., and may execute a computer program stored in a computer-readable medium.

While exemplary embodiments have been particularly shown and described above, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description of exemplary embodiments, but by the appended claims, and all differences within the scope will be construed as being included in the present invention.

The invention claimed is:

1. An adaptive filtering method comprising:
   obtaining a parameter indicating a closeness of pixel values of pixels adjacent to a block boundary with respect to a predetermined line;
   determining whether a weak filtering is performed or not at the block boundary based on the obtained parameter; and
   performing the weak filtering when it is determined that the weak filtering is performed,
   wherein pixel values of pixels positioned in a first side with respect to the block boundary are p0 and p1 and pixel values of pixels positioned in a second side with respect to the block boundary are q0 and q1,
   wherein the pixels having the pixel values of p0 and q0 are adjacent to the block boundary, and
   wherein the parameter is obtained by determining a difference between a slope of the pixel values p0 and q0 and a slope of the pixel values p1 and q1.

2. The adaptive filtering method of claim 1, wherein the obtaining the parameter comprises obtaining the parameter based on a difference between pixel values of pixels that are symmetrically positioned with respect to the block boundary.

3. The adaptive filtering method of claim 1, wherein the obtaining the parameter comprises obtaining the parameter based on a difference between pixel values of pixels that are symmetrically positioned with respect to the block boundary, and a difference between slopes that are determined according to distances between the pixels that are symmetrically positioned with respect to the block boundary.

4. The adaptive filtering method of claim 1, wherein, when pixel values of pixels positioned in a first side with respect to the block boundary are p0 and p1, pixel values of pixels positioned in a second side with respect to the block boundary are q0 and q1, the pixels having the pixel values of p0 and q0 are adjacent to the block boundary, and the parameter is a parameter $\Delta$, the obtaining the parameter comprises obtaining the parameter $\Delta$ according to Equation $\Delta=(9*(q0-p0)-3*(q1-p1))/16$.

5. The adaptive filtering method of claim 1, wherein the determining whether a weak filtering is performed or not comprises determining whether the weak filtering is performed or not based on a comparison between an absolute value of the parameter and a predetermined threshold value.

6. The adaptive filtering method of claim 5, wherein the predetermined threshold value is based on a quantization parameter (QP) used in quantization of blocks adjacent to the block boundary.

7. The adaptive filtering method of claim 5, wherein, if the absolute value of the parameter is greater than the predetermined threshold value, the filtering is not performed.

8. The adaptive filtering method of claim 1, wherein, when pixel values of pixels positioned in a first side with respect to the block boundary are p0, p1, and p2, pixel values of pixels positioned in a second side with respect to the block boundary are q0, q1, and q2, the pixels having the pixel values of p0 and q0 are adjacent to the block boundary, and the parameter is a parameter $\Delta$, if the parameter $\Delta$ obtained according to Equation $\Delta=(9*(q0-p0)-3*(q1-p1))/16$ is less than a predetermined threshold value, the performing the filtering comprises performing filtering according to an algorithm so as to replace the pixel values p0, p1, q0, and q1 with p0', p1', q0', and q1', the algorithm being:

```
{
p0'=p0+Δ;
q0'=q0−Δ;
Δp1=(p0−2*p1+p2+2*Δ)/4;
p1'=p1+Δp1;
Δq1=(q0−2*q1+q2−2*Δ)/4;
q1'=q1+Δq1
}.
```

9. An adaptive filtering apparatus comprising:
   a parameter obtainer which obtains a parameter indicating a closeness of pixel values of pixels adjacent to a block boundary with respect to a predetermined line;
   a filtering strength determiner which determines whether a weak filtering is performed or not at the block boundary based on the obtained parameter; and
   a filtering performer which performs the weak filtering when it is determined that the weak filtering is performed,
   wherein pixel values of pixels positioned in a first side with respect to the block boundary are p0 and p1 and pixel values of pixels positioned in a second side with respect to the block boundary are q0 and q1,
   wherein the pixels having the pixel values of p0 and q0 are adjacent to the block boundary, and
   wherein the parameter is obtained by determining a difference between a slope of the pixel values p0 and q0 and a slope of the pixel values p1 and q1.

10. The adaptive filtering apparatus of claim 9, wherein the parameter obtaining unit obtains the parameter based on a difference between pixel values of pixels that are symmetrically positioned with respect to the block boundary.

11. The adaptive filtering apparatus of claim 9, wherein the parameter obtaining unit obtains the parameter based on a difference between pixel values of pixels that are symmetrically positioned with respect to the block boundary, and a difference between slopes that are determined according to distances between the pixels that are symmetrically positioned with respect to the block boundary.

12. The adaptive filtering apparatus of claim 9, wherein, when pixel values of pixels positioned in a first side with respect to the block boundary are p0 and p1, pixel values of pixels positioned in a second side with respect to the block boundary are q0 and q1, the pixels having the pixel values of p0 and q0 are adjacent to the block boundary, and the parameter is a parameter $\Delta$, the parameter obtaining unit obtains the parameter $\Delta$ according to Equation $\Delta=(9*(q0-p0)-3*(q1-p1))/16$.

13. The adaptive filtering apparatus of claim 9, when pixel values of pixels positioned in a first side with respect to the block boundary are p0, p1, and p2, pixel values of pixels positioned in a second side with respect to the block boundary are q0, q1, and q2, the pixels having the pixel values of p0 and q0 are adjacent to the block boundary, and the parameter is a parameter $\Delta$, if the parameter $\Delta$ obtained according to Equation $\Delta=(9*(q0-p0)-3*(q1-p1))/16$ is less than a predetermined threshold value, the filtering performing unit performs filtering according to an algorithm so as to replace the pixel values p0, p1, q0, and q1 with p0', p1', q0', and q1', the algorithm being:

```
{
p0'=p0+Δ;
q0'=q0−Δ;
Δp1=(p0−2*p1+p2+2*Δ)/4;
p1'=p1+Δp1;
Δq1=(q0−2*q1+q2−2*Δ)/4;
q1'=q1+Δq1
}.
```

14. An adaptive filtering method comprising:

determining whether a weak filtering is performed or not at a block boundary based on a closeness of pixel values of pixels adjacent to the block boundary with respect to a predetermined line; and performing a weak filtering when it is determined that the weak filtering is performed, wherein pixel values of pixels positioned in a first side with respect to the block boundary are p0 and p1 and pixel values of pixels positioned in a second side with respect to the block boundary are q0 and q1, wherein the pixels having the pixel values of p0 and q0 are adjacent to the block boundary, and wherein the parameter is obtained by determining a difference between a slope of the pixel values p0 and q0 and a slope of the pixel values p1 and q1.

15. The adaptive filtering method of claim 14, wherein the determining whether a weak filtering is performed or not comprises determining whether the weak filtering is performed or not based on a comparison between an absolute value of the parameter and a predetermined threshold value.

16. A non-transitory computer readable recording medium having recorded thereon a program executable by a computer for performing the method of claim 1.

17. A non-transitory computer readable recording medium having recorded thereon a program executable by a computer for performing the method of claim 14.

* * * * *